(12) United States Patent
Gotanda et al.

(10) Patent No.: US 10,839,363 B2
(45) Date of Patent: Nov. 17, 2020

(54) CHECKOUT SYSTEM

(71) Applicant: TOSHIBA TEC KABUSHIKI KAISHA, Tokyo (JP)

(72) Inventors: Tsuyoshi Gotanda, Tokyo (JP); Akiko Susaki, Tokyo (JP); Nobuhiro Sugita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 15/939,466

(22) Filed: Mar. 29, 2018

(65) Prior Publication Data

US 2018/0218349 A1 Aug. 2, 2018

Related U.S. Application Data

(63) Continuation of application No. 15/007,278, filed on Jan. 27, 2016, now abandoned.

(30) Foreign Application Priority Data

Feb. 6, 2015 (JP) .................................. 2015-021701

(51) Int. Cl.
*G06Q 20/20* (2012.01)
*G07F 5/22* (2006.01)
(Continued)

(52) U.S. Cl.
CPC ......... *G06Q 20/204* (2013.01); *G06Q 20/047* (2020.05); *G07F 5/22* (2013.01); *G07G 1/14* (2013.01)

(58) Field of Classification Search
CPC ..... G06Q 20/204; G06Q 20/0453; G07G 1/14
See application file for complete search history.

(56) References Cited

U.S. PATENT DOCUMENTS

2016/0232506 A1 8/2016 Gotanda et al.

FOREIGN PATENT DOCUMENTS

| JP | 05-73771 | 3/1993 |
|---|---|---|
| JP | 2003-248867 | 9/2003 |

(Continued)

OTHER PUBLICATIONS

Japanese Office Action for Japanese Patent Application No. 2017-220702 dated Jul. 17, 2018.

(Continued)

*Primary Examiner* — A. Hunter Wilder
*Assistant Examiner* — Joseph M Mutscheler
(74) *Attorney, Agent, or Firm* — Amin, Turocy & Watson, LLP

(57) ABSTRACT

An input unit adds input data of a charging amount in a storage section which stores transaction data of a settlement target according to data relating to commodity sales. If an input end instruction for the data relating to commodity sales is received, the data stored in the storage section is output to a settlement unit. The settlement unit carries out a settlement processing for a transaction generating a transaction amount calculated according to the data from the input unit on condition that money is received in a payment amount above the transaction amount. If the data from the input unit includes data relating to a charging amount, the settlement unit adds, with a card reader/writer, the charging amount to the balance of electronic money on condition that money is received in the payment amount above the charging amount with a settlement method different from an electronic money settlement method.

8 Claims, 12 Drawing Sheets

(51) Int. Cl.
*G07G 1/14* (2006.01)
*G06Q 20/04* (2012.01)

(56) References Cited

FOREIGN PATENT DOCUMENTS

| | | |
|---|---|---|
| JP | 2006-344123 | 12/2006 |
| JP | 2013-242839 | 12/2013 |
| JP | 2015-026125 | 2/2015 |
| JP | 2015026125 A * | 2/2015 |
| JP | 6247238 | 12/2017 |

OTHER PUBLICATIONS

Japanese Office Action for Japanese Patent Application No. 2015-021701 dated Jun. 27, 2017.
Japanese Office Action for Japanese Patent Application No. 2015-021701 dated Jul. 18, 2017.
Japanese Notice of Submission of Information for Japanese Patent Application No. 2015-021701 dated Aug. 29, 2017.

* cited by examiner

| COMMODITY CODE | COMMODITY NAME | UNIT PRICE | QUANTITY | AMOUNT | ATTRIBUTE |
|---|---|---|---|---|---|
| 123456789 | COMMODITY A | 600 | 1 | 600 | 0 |
| 999999999 | CHARGE | 5,000 | 1 | 5,000 | 1 |
| 123451234 | COMMODITY B | 1,000 | 2 | 2,000 | 0 |
| ... | ... | ... | ... | ... | ... |

31(31a, 31b)
RC1
RC2
RC3

| TOTAL QUANTITIES | TOTAL AMOUNT |
|---|---|
| m | n |

CHECKOUT SYSTEM

CROSS-REFERENCE TO RELATED APPLICATIONS

This application is a Continuation of application Ser. No. 15/007,278 filed Jan. 27, 2016, the entire contents of which are incorporated herein by reference.

This application is based upon and claims the benefit of priority from Japanese Patent Application No. 2015-021701, filed Feb. 6, 2015, the entire contents of which are incorporated herein by reference.

FIELD

Embodiments described herein relate generally to a checkout system.

BACKGROUND

The checkout system for a large retail store includes one of various types thereof in which an input unit for inputting commodity data and a settlement unit for settling one transaction are separated from each other. The input unit waits for the input of data relating to commodity sales. After data is input, the input unit generates transaction data of a settlement target according to the input data and transmits the transaction data to the settlement unit. The settlement unit waits for the deposition of a payment amount according to a transaction amount calculated based on the transaction data. If the payment amount equal to or more than the transaction amount is received, then the settlement unit carries out a settlement processing for the transaction amount.

Electronic money settlement is one of the methods for the settlement of a payment amount. A storage medium (IC card, a mobile phone and a smart phone) in which electronic money is pre-stored is used in the electronic money settlement. If the balance of electronic money is greater than the transaction amount, the settlement unit deducts the transaction amount from the balance of electronic money. Then, the transaction is settled.

If the balance of electronic money is smaller than the transaction amount, then the settlement unit disables the storage medium from the electronic settlement by electronic money. In this case, the settlement unit which cannot carry out an electronic money settlement waits for the deposition of money other than the electronic money, as one method. As another method, the settlement unit saves the balance of electronic money in the storage medium and sets the balance of electronic money to '0'. Then, the settlement unit waits for the deposition of money other than the electronic money for the remaining settlement amount obtained by deducting the balance of electronic money from the transaction amount.

The electronic money stored in the storage medium can be charged (deposited) with the use of the dedicated depositing device for electronic money. Recently, a POS (Point of Sales) terminal constituting a checkout system is also used to charge electronic money. However, in the conventional POS terminal, after data relating to a purchased commodity is input, electronic money cannot be charged until the settlement of a transaction relating to the sales of the commodity is completed.

DESCRIPTION OF THE DRAWINGS

FIG. 3 is a schematic diagram illustrating the data memory areas formed in the RAMs of the commodity registration apparatus and the settlement apparatus;

DETAILED DESCRIPTION

In an embodiment, a checkout system comprises an input unit and a settlement unit. The input unit includes a storage module, an addition module and an output module. The storage module receives input of a transaction data including a commodity sales or a rendering of service relating to a settlement target and stores the transaction data of the settlement target in a storage section. The addition module receives the input of a charging amount relating to electronic money and adds the data of the input charging amount in the storage section. The output module outputs the data stored in the storage section to the settlement unit if an input completion instruction for ending the input of the transaction data relating to the settlement target is received. The settlement unit includes a reader/writer, a processing module and a charging module. The reader/writer reads the balance of the electronic money stored in a storage medium and rewrites the balance in the storage medium. The processing module receives the input of a payment amount to carry out a settlement processing for a transaction amount of the settlement target calculated according to the data output from the input unit on condition that the payment amount greater than the transaction amount is deposited. The charging module adds, using the reader/writer, the charging amount to the balance of the electronic money on condition that the payment amount greater than the charging amount is received with a settlement method different from an electronic money settlement method if the data output from the input unit includes data relating to the charging amount.

Embodiments of the checkout system which allows the charging of electronic money before a transaction relating to commodity sales is settled even after data relating to a purchased commodity is input are described below with reference to the accompanying drawings. Further, in the embodiments, an electronic money charging function is applied to a so-called semi-self-service checkout system in which an input unit operated by a store clerk is separated from a settlement unit operated by a customer.

First Embodiment

Figure 1:
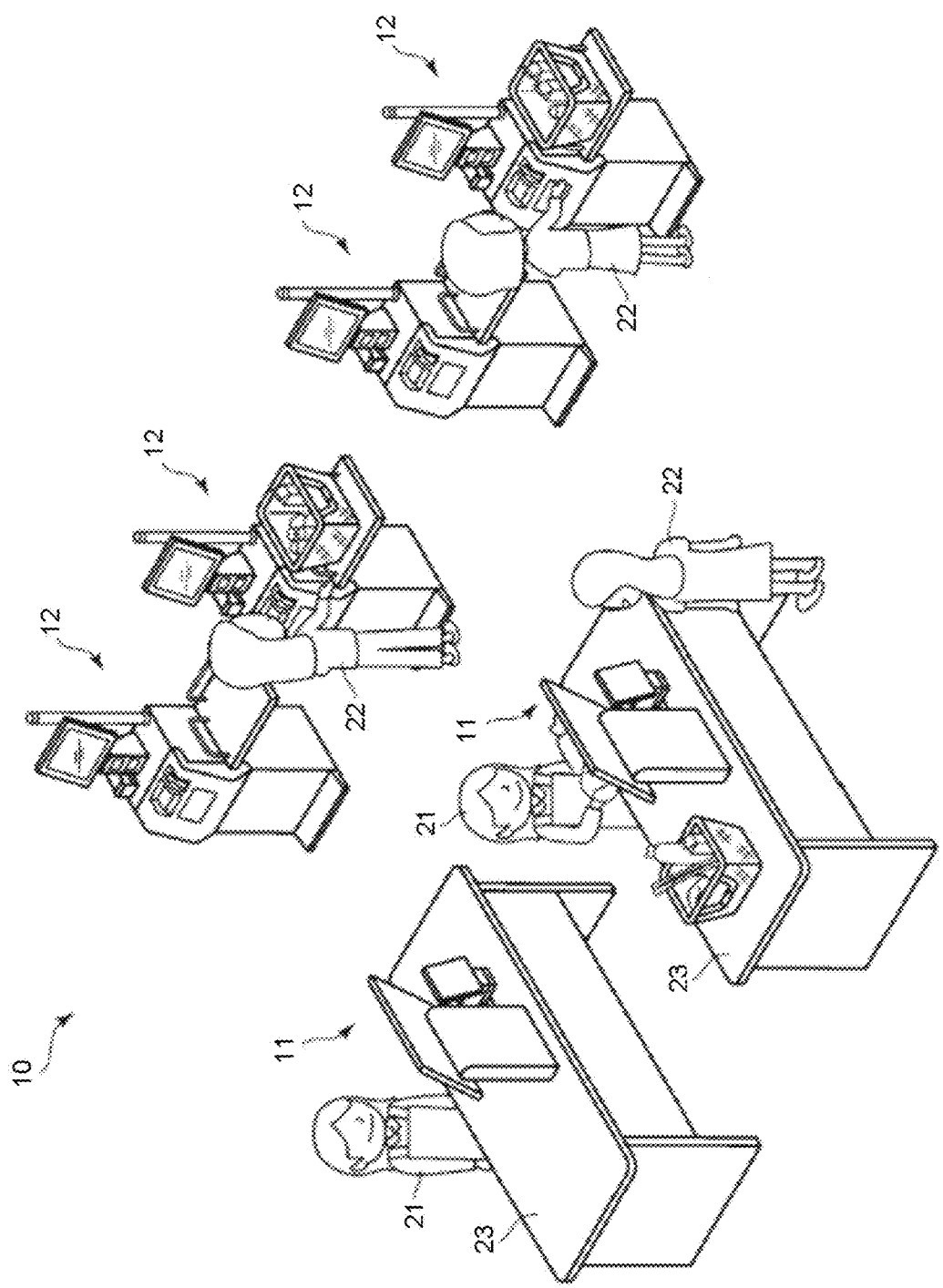
FIG. 1 is a perspective view of a checkout system according to an embodiment.

FIG. 1 is a perspective view of a checkout system 10 according to the present embodiment. The checkout system 10 comprises at least one commodity registration apparatus 11 and at least one settlement apparatus 12. The checkout system 10 comprising two commodity registration apparatuses 11 and four settlement apparatuses 12 is shown in FIG. 1. The checkout system 10 may be equipped with an optional number of commodity registration apparatuses 11 and an optional number of settlement apparatuses 12, and the ratio of the number of the commodity registration apparatuses 11 to that of the settlement apparatuses 12 may be an optional value. The commodity registration apparatus 11 and the settlement apparatus 12 are arranged at a checkout zone in a store such as a supermarket.

A store clerk 21 acting as a checker in the store is an operator for the commodity registration apparatus 11. A customer 22 who purchases a commodity sold in the store is an operator for the settlement apparatus 12. However, there is a case that the settlement apparatus 12 is operated by the store clerk 21.

In FIG. 1, the commodity registration apparatus 11 is arranged on a working table 23. The working table 23 has a rectangular top plate. A plurality of working tables 23 are arranged with the top plates thereof substantially parallel to each other in the length direction to form a passage for the customer 22 therebetween.

The commodity registration apparatus 11 has functions of carrying out a purchased commodity registration processing, generating settlement information, carrying out a settlement processing and notifying the settlement apparatus of settlement information. The registration processing refers to a processing of registering a commodity purchased by the customer 22 as a purchased commodity. The settlement processing refers to a processing of settling a transaction relating to the sales of purchased commodities. The settlement information refers to information needed for the execution of the settlement processing. In other words, the commodity registration apparatus 11 functions as an input unit for inputting data relating to commodity sales. There is a case in which the commodity registration apparatus 11 also functions as a settlement unit for settling a transaction relating to commodity sales.

If the settlement information is transferred from the commodity registration apparatus 11, the settlement apparatus 12 carries out a settlement processing based on the settlement information. The settlement apparatus 12 functions as a settlement unit for settling a transaction relating to commodity sales.

Figure 2:
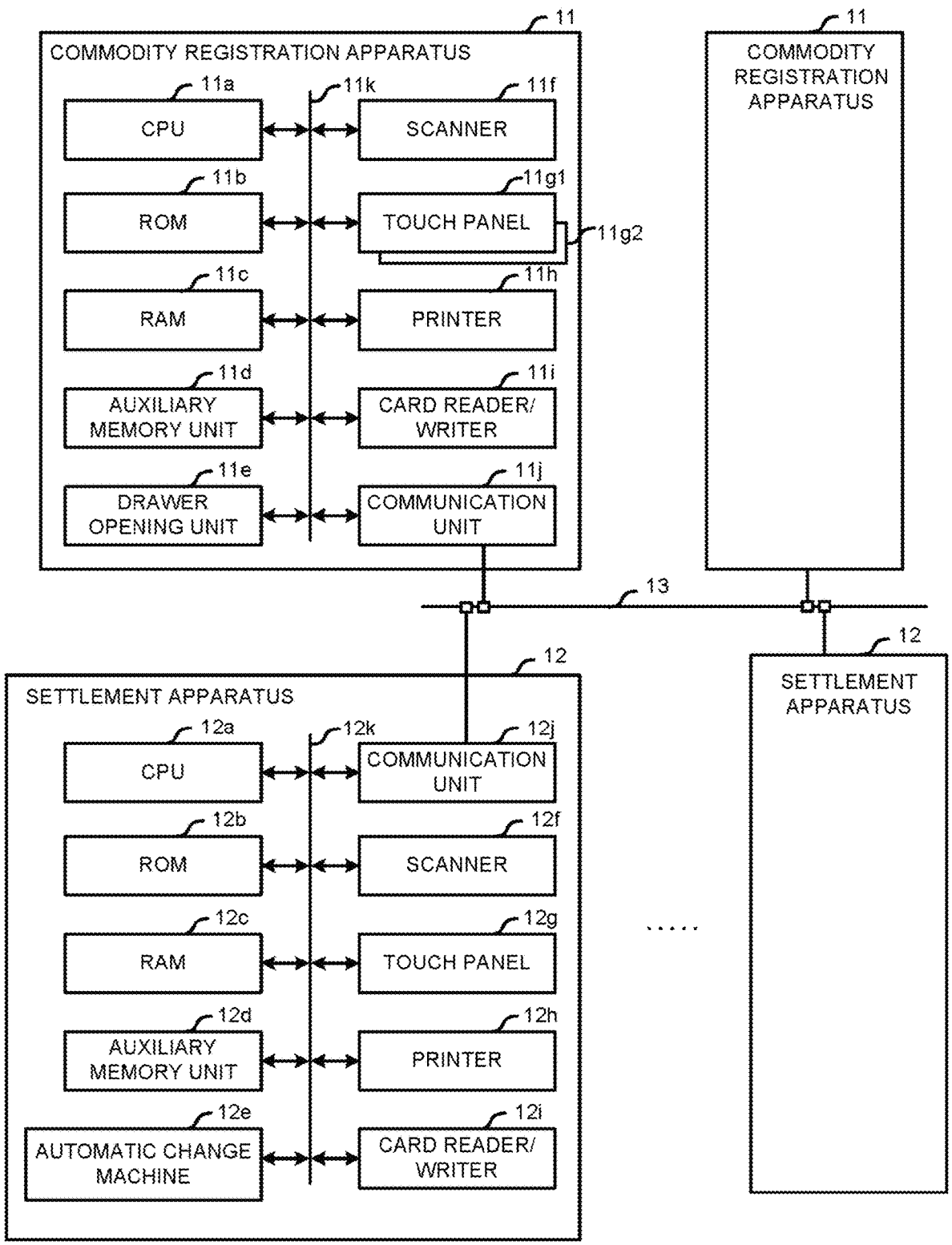
FIG. 2 is a block diagram illustrating a commodity registration apparatus and a settlement apparatus constituting the checkout system.

FIG. 2 is a block diagram illustrating the commodity registration apparatus 11 and the settlement apparatus 12. The commodity registration apparatus 11 and the settlement apparatus 12 are both connected with a LAN (Local Area Network) 13 serving as a network. The LAN 13 may be replaced with another communication network such as the Internet or a wireless LAN. Alternatively, information is transmitted and received between the commodity registration apparatus 11 and the settlement apparatus 12 via a server.

The commodity registration apparatus 11 comprises a CPU (Central Processing Unit) 11$a$, a ROM (Read-Only Memory) 11$b$, a RAM (Random-Access Memory) 11$c$, an auxiliary memory unit 11$d$, a drawer opening unit 11$e$, a scanner 11$f$, touch panels 11$g$1 and 11$g$2, a printer 11$h$, a card reader/writer 11$i$, a communication unit 11$j$ and a transmission system 11$k$.

The CPU 11$a$, the ROM 11$b$, the RAM 11$c$ and the auxiliary memory unit 11$d$ are connected with each other via the transmission system 11$k$ to constitute a computer.

The CPU 11$a$ acts as a main unit of the computer. The CPU 11$a$ controls each section for realizing various functions of the commodity registration apparatus 11 according to the operating system, middlewares and application programs stored in the ROM 11$b$ and the RAM 11$c$.

The ROM 11$b$ acts as a main memory unit of the computer. The ROM 11$b$ stores the foregoing operating system. The ROM 11$b$ also stores the middlewares or application programs in some cases. Further, in some cases, the ROM 11$b$ also stores data which is referred to by the CPU 11$a$ for the execution of various processing.

The RAM 11$c$ acts as a main memory unit of the computer. The RAM 11$c$ also stores the data which is referred to by the CPU 11$a$ for the execution of various processing. Further, the RAM 11$c$ is used as a so-called working area in which data temporarily used by the CPU 11$a$ to carry out various processing is stored in advance.

The auxiliary memory unit 11$d$ acts as the auxiliary memory unit of the computer. The auxiliary memory unit 11$d$ stores data used by the CPU 11$a$ to carry out various processing or data generated in the various processing executed by the CPU 11$a$. The auxiliary memory unit 11$d$ may be, for example, an EEPROM (Electric Erasable Programmable Read-Only Memory), an HDD (Hard Disk Drive) or an SSD (Solid State Drive).

Application programs stored in the ROM 11$b$ or the auxiliary memory unit 11$d$ include a control program which describes with respect to a control processing described later. The commodity registration apparatus 11 is generally transferred while the control program is stored in the ROM 11$b$ or the auxiliary memory unit 11$d$. However, in some cases, the commodity registration apparatus 11 is transferred in a state that the control program is not stored in the ROM 11$b$ or the auxiliary memory unit 11$d$. In these cases, the control program is transferred by being recorded in a removable recording medium such as a magnetic disk, a magneto-optical disc, an optical disk, a semiconductor memory or the like. Alternatively, the control program is transferred via a network, and the control program may be written into the auxiliary memory unit 11$d$ of the commodity registration apparatus 11 which is transferred in another way.

The drawer opening unit 11$e$ automatically opens a drawer which receives money including banknotes and coins.

The scanner 11*f* reads a commodity code of a commodity to acquire information of the commodity. The scanner 11*f* may be various known scanners. The scanner 11*f* may correspond to one or a plurality of known various types of scanner. The scanner 11*f* may include a fixed or handy type two-dimensional code scanner. Further, the scanner 11*f* may also include a scanner which recognizes the category of a commodity according to the image of the commodity with an image recognition technology.

One of the two touch panels 11*g*1 and 11*g*2 is for the store clerk while the other one for a customer. The touch panels 11*g*1 and 11*g*2 both include a display device and a touch sensor. The display device displays a display screen thereon to be an optional screen such as a GUI screen. The display device may be, for example, a well-known device such as a color LCD. The touch sensor is overlaid on the display surface of the display device. The touch sensor detects the touch position on the display surface of the display device by the operator and sends the position information to the CPU 11*a*. The touch sensor may be a well-known device.

The touch panel 11*g*1 for store clerk is arranged on the working table 23 with the display screen thereof facing a working space for the store clerk 21. The touch panel 11*g*2 for customer is arranged on the working table 23 with the display screen thereof facing the passage for a customer 22.

The printer 11*h* issues a receipt by printing various character strings or images on a receipt sheet. The printer 11*h* may be, for example, a thermal printer or an impact dot printer.

The card reader/writer 11*i* has a function of reading data recorded in a card and a function of writing data into the card. The card may include a membership card such as a so-called owner's card, point card and the like in addition to a settlement card such as a credit card, a debit card, an electronic money card or a prepaid card. The card reader/writer 11*i* reads the electronic money data (e.g. balance) stored in an electronic money card and rewrites the electronic money data. The card reader/writer 11*i* may be one of a magnetic card reader/writer, a contact type card reader/writer and a non-contact type card reader/writer or include a plurality of the foregoing devices.

The communication unit 11*j* carries out data communication with a plurality of settlement apparatuses 12 which are connected with each other via the LAN 13. The communication unit 11*j* can carry out the data communication with other commodity registration apparatuses 11 via the LAN 13.

The transmission system 11*k* transmits data sent or received among the CPU 11*a*, the ROM 11*b*, the RAM 11*c*, the auxiliary memory unit 11*d*, the drawer opening unit 11*e*, the scanner 11*f*, the touch panels 11*g*1 and 11*g*2, the printer 11*h*, the card reader/writer 11*i* and the communication unit 11*j*. The transmission system 11*k* may be a well-known system which includes various buses such as a system bus and various interface circuits for connecting the buses with each section.

The hardware of the commodity registration apparatus 11 may be, for example, a well-known POS terminal.

The settlement apparatus 12 comprises a CPU 12*a*, a ROM 12*b*, a RAM 12*c*, an auxiliary memory unit 12*d*, an automatic change machine 12*e*, a scanner 12*f*, a touch panel 12*g*, a printer 12*h*, a card reader/writer 12*i*, a communication unit 12*j* and a transmission system 12*k*.

The CPU 12*a*, the ROM 12*b*, the RAM 12*c* and the auxiliary memory unit 12*d* are connected with each other via the transmission system 12*k* to constitute a computer.

The CPU 12*a* acts as a main unit of the computer. The CPU 12*a* controls each section for realizing various functions of the settlement apparatus 12 according to the operating system, middleware and application programs stored in the ROM 12*b* and the RAM 12*c*.

The ROM 12*b* acts as the main memory unit of the computer. The ROM 12*b* stores the foregoing operating system. There may be a case in which the ROM 12*b* also stores the middleware or application programs. Further, the ROM 12*b* also stores data which is referred to by the CPU 12*a* to carry out various processing.

The RAM 12*c* acts as the main memory unit of the computer. The RAM 11*c* also stores the data which is referred to by the CPU 12*a* to carry out various processing. Further, the RAM 12*c* can be used as a so-called working area in which data temporarily used by the CPU 12*a* to carry out various processing is stored in advance.

The auxiliary memory unit 12*d* acts as the auxiliary memory unit of the computer. The auxiliary memory unit 12*d* stores data used by the CPU 12*a* to carry out various processing or data generated in various processing executed by the CPU 12. The auxiliary memory unit 12*d* may be, for example, an EEPROM, an HDD or an SSD.

The application programs stored in the ROM 12*b* or the auxiliary memory unit 12*d* include a control program which describes with respect to the control processing described later. The settlement apparatus 12 is generally transferred while the control program is stored in the ROM 12*b* or the auxiliary memory unit 12*d*. However, the settlement apparatus 12 is also transferred while the control program is not stored in the ROM 12*b* or the auxiliary memory unit 12*d*. In these cases, the control program is transferred by being recorded in a removable recording medium such as a magnetic disk, a magneto-optical disc, an optical disk, a semiconductor memory or the like. Alternatively, the control program is transferred via a network. The control program is written into the auxiliary memory unit 12*d* of the settlement apparatus 12 which is transferred in another way.

The automatic change machine 12*e* receives deposited coins and bills. The automatic change machine 12*e* dispenses coins and bills as change.

The scanner 12*f* reads a commodity code of a commodity to acquire information of the commodity. The scanner 12*f* may be various known scanners. The scanner 12*f* may correspond to one or a plurality of known types of scanner. The scanner 12*f* may include a fixed or handy-type two-dimensional code scanner. Further, the scanner 12*f* may also include a scanner which recognizes the category of a commodity according to the image of the commodity with an image recognition technology.

The touch panel 12*g* includes a display device and a touch sensor. The display device displays a display screen thereon to be an optional screen such as a GUI screen. The display device may be, for example, a well-known device such as a color LCD. The touch sensor is overlaid on the display surface of the display device. The touch sensor detects the touch position on the display surface of the display device by the operator and sends the position information to the CPU 12*a*. The touch sensor may be a well-known device.

The printer 12*h* issues a receipt by printing various strings or images on a receipt sheet. The printer 12*h* may be, for example, a thermal printer or an impact dot printer.

The card reader/writer 12*i* has a function of reading data recorded on a card and a function of writing data into the card. The card may be a membership card such as a so-called owner's card, a point card or the like in addition to a settlement card such as a credit card, a debit card, an electronic money card and prepaid card. The card reader/writer 12*i* reads the electronic money data (e.g. balance) stored in an electronic money card and rewrites the electronic money data. The card reader/writer 12*i* may be one of a magnetic card reader/writer, a contact type card reader/writer and a non-contact type card reader/writer or include a plurality of the foregoing devices.

The communication unit 12*j* carries out a data communication with a plurality of commodity registration apparatuses 11 which are connected with each other via the LAN 13. The communication unit 12*j* can carry out the data communication with other settlement apparatuses 12 via the LAN 13.

The transmission system 12*k* transmits data sent or received among the CPU 12*a*, ROM 12*b*, the RAM 12*c*, the auxiliary memory unit 12*d*, the automatic change machine 12*e*, the scanner 12*f*, the touch panel 12*g*, the printer 12*h*, the card reader/writer 12*i* and the communication unit 12*j*. The transmission system 12*k* may be a well-known system which includes various buses such as a system bus and various interface circuits for connecting the buses with each section.

Further, the hardware of the settlement apparatus 12 may be, for example, a well-known self-checkout POS terminal.

As stated above, in the checkout system 10 in which the commodity registration apparatus 11 serving as an input unit and the settlement apparatus 12 serving as a settlement unit are separated from each other, data memory areas 31 and 32 shown in FIG. 3 are respectively formed in the RAM 11*c* of the commodity registration apparatus 11 and the RAM 12*c* of the settlement apparatus 12.

The data memory area 31 is used for storing a plurality of records RC1, RC2, RC3 . . . each of which consists of a commodity code, a commodity name, a unit price, a quantity, an amount, an attribute and the like. The commodity code is a fixed code for identifying a commodity. Each commodity is assigned with a commodity code represented by a barcode. The commodity name and the unit price recorded in a record refer to the commodity name and the unit price of the commodity determined by the commodity code recorded in the same record. The quantity and the amount recorded in a record are sales data of the commodity, i.e., the sales quantity of the commodity and the sales amount for the sales quantity, determined by the commodity code recorded in the same record.

Although it is not illustrated, the checkout system 10 is connected with a database server via the LAN 13. A commodity database for setting commodity information (e.g. commodity name and the unit price) of each commodity in association with the commodity code thereof is stored in the database server. In the commodity registration apparatus 11 or the settlement apparatus 12, if a commodity code is input, then the CPU 11*a* or 12*a* inquires of the database server commodity information of the commodity with the commodity code. The database server receiving the inquiry accesses the commodity database to read, from the commodity database, the commodity information associated with the commodity code. Moreover, the database server notifies the commodity registration apparatus 11 or the settlement apparatus 12 of the read commodity information via the LAN 13. The CPU 11*a* of the commodity registration apparatus 11 or the CPU 12*a* of the settlement apparatus 12 generates a record relating to the sales of the commodity based on the commodity information notified from the database server and stores the generated record in the data memory area 31.

The commodity registration apparatus 11 receives the input of a charging amount for an electronic money. After the charging amount is input, the CPU 11*a* generates a record relating to a charging amount and stores the generated record in the data memory area 31. In the record relating to a charging amount, preset data (e.g. '999999999' and 'charge') are used as a commodity code and a commodity name. In the record relating to a charging amount, the charging amount is set as a unit price, and '1' is set as a charging quantity. Thus the sales amount of one record relating to the charging amount is equal to the charging amount.

The attribute is used to identify whether the records RC1, RC2, RC3, . . . relate to a commodity sales or a charging amount. In the present embodiment, the attribute of a record relating to commodity sales is set to '0' and that of a record relating to a charging amount is set to '1'. However, the values of the attribute are not limited to the foregoing example. Incidentally, in FIG. 3, records RC1 and RC3 relate to a commodity sales and record RC2 relates to a charging amount.

The data memory area 31 is referred to as a transaction memory. Hereinafter, a transaction memory 31*a* indicates a data memory area of the commodity registration apparatus 11, and a transaction memory 31*b* hereinafter indicates a data memory area of the settlement apparatus 12.

The data memory area 32 stores a total quantity and a total amount. The total quantity is the total of quantities stored in the records RC1, RC2, RC3, . . . stored in the transaction memory 31. The total amount is the total of the amounts contained in the records RC1, RC2, RC3, . . . stored in the transaction memory 31.

The data memory area 32 is referred to as a total memory. Hereinafter, a total memory 32*a* indicates a data memory area of the commodity registration apparatus 11, and a total memory 32*b* indicates a data memory area of the settlement apparatus 12.

Figure 4:
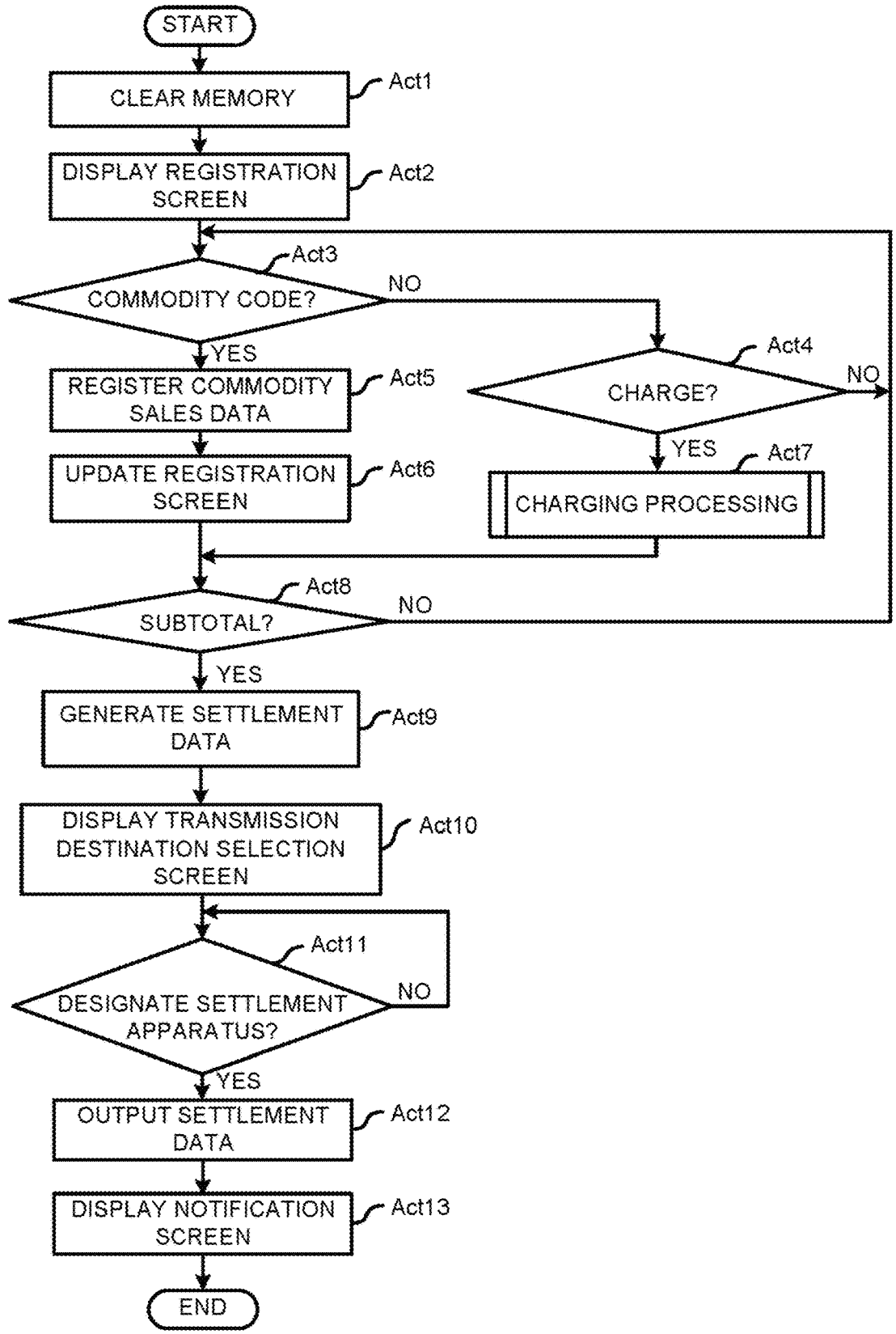
FIG. 4 is a flowchart illustrating the main operations carried out by a CPU of the commodity registration apparatus in a control processing according to a control program.
Figure 5:
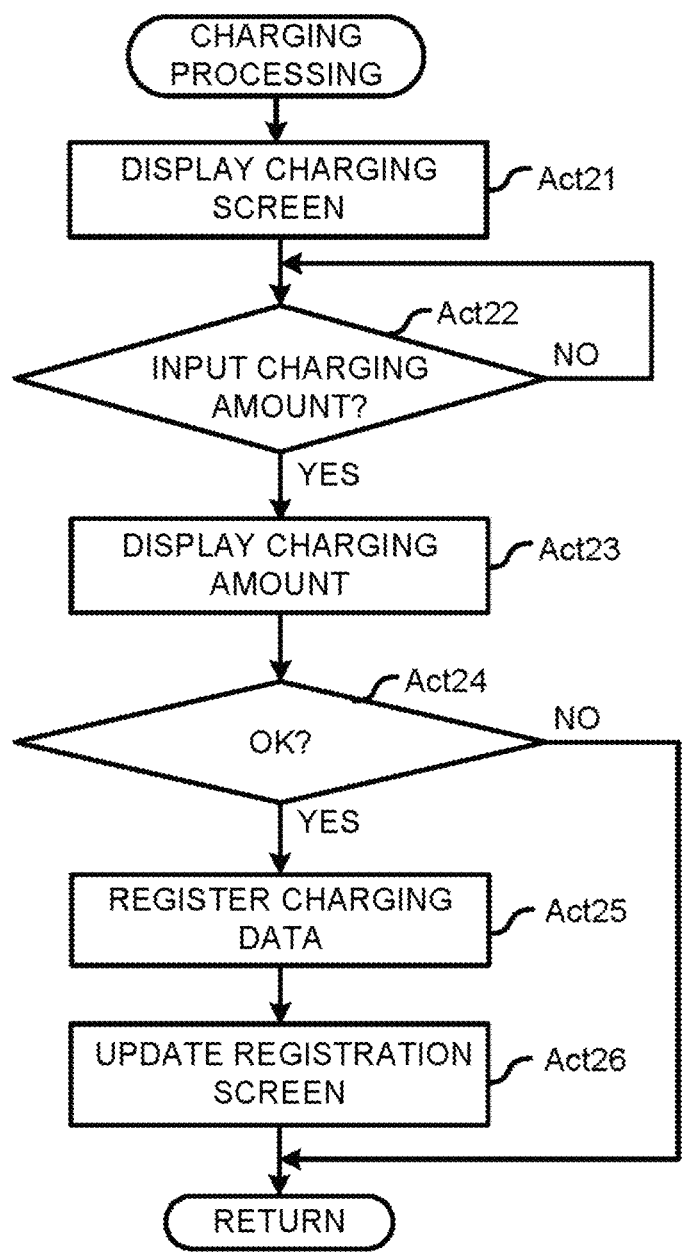
FIG. 5 is a flowchart illustrating detailed operations carried out in a charging processing shown in FIG. 4.
Figure 9:
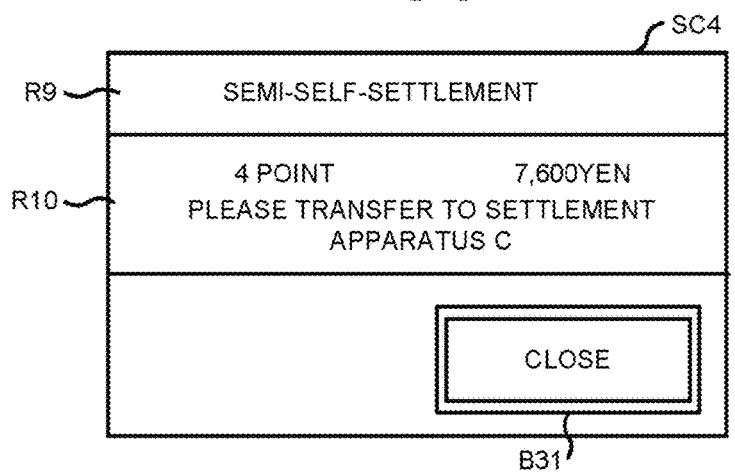
FIG. 9 is a schematic diagram exemplifying a notification screen displayed on the touch panel of the commodity registration apparatus.
Figure 10:
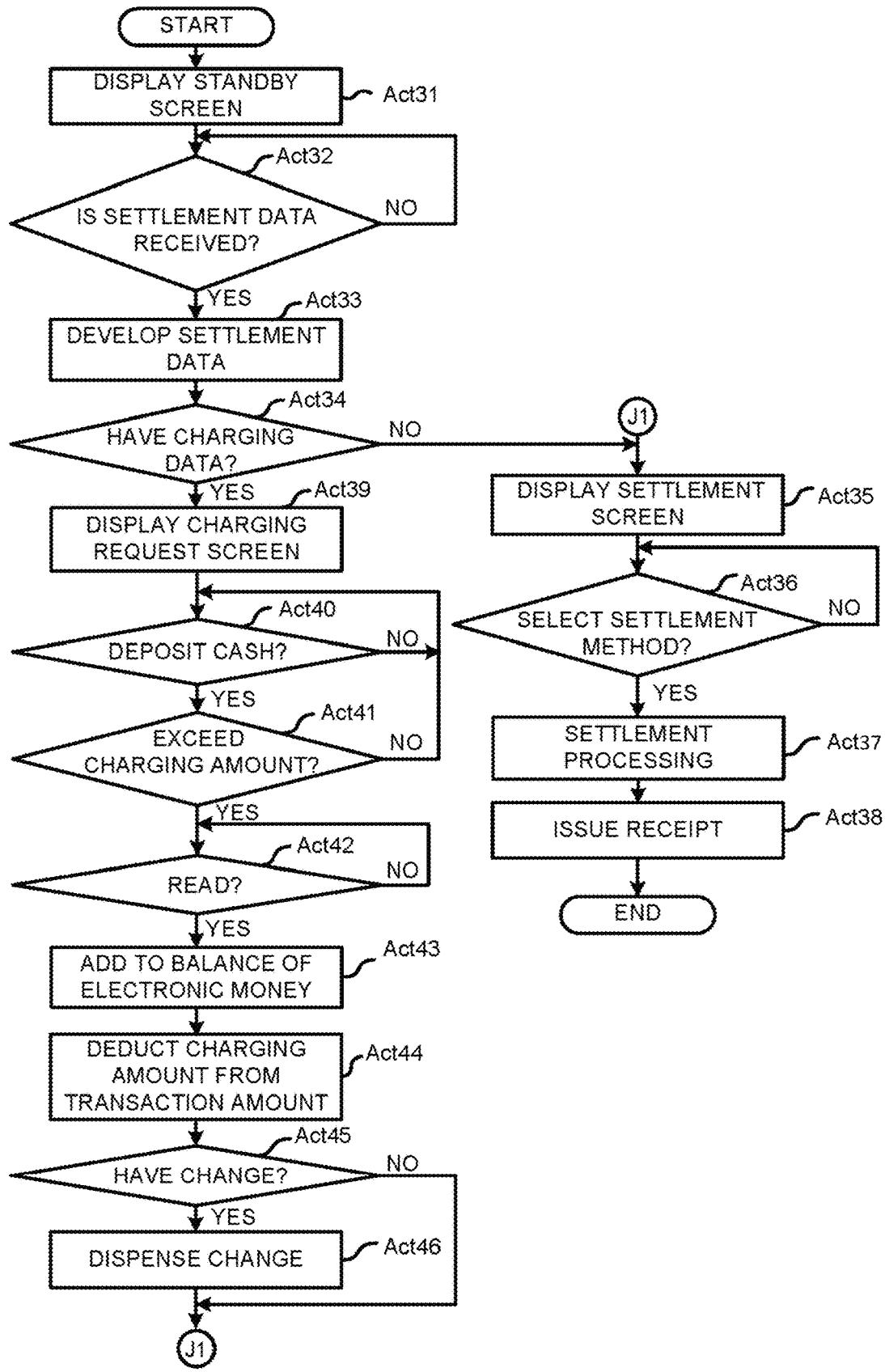
FIG. 10 is a flowchart illustrating the main operations carried out by the CPU of the settlement apparatus in a control processing according to a control program.
Figure 11:
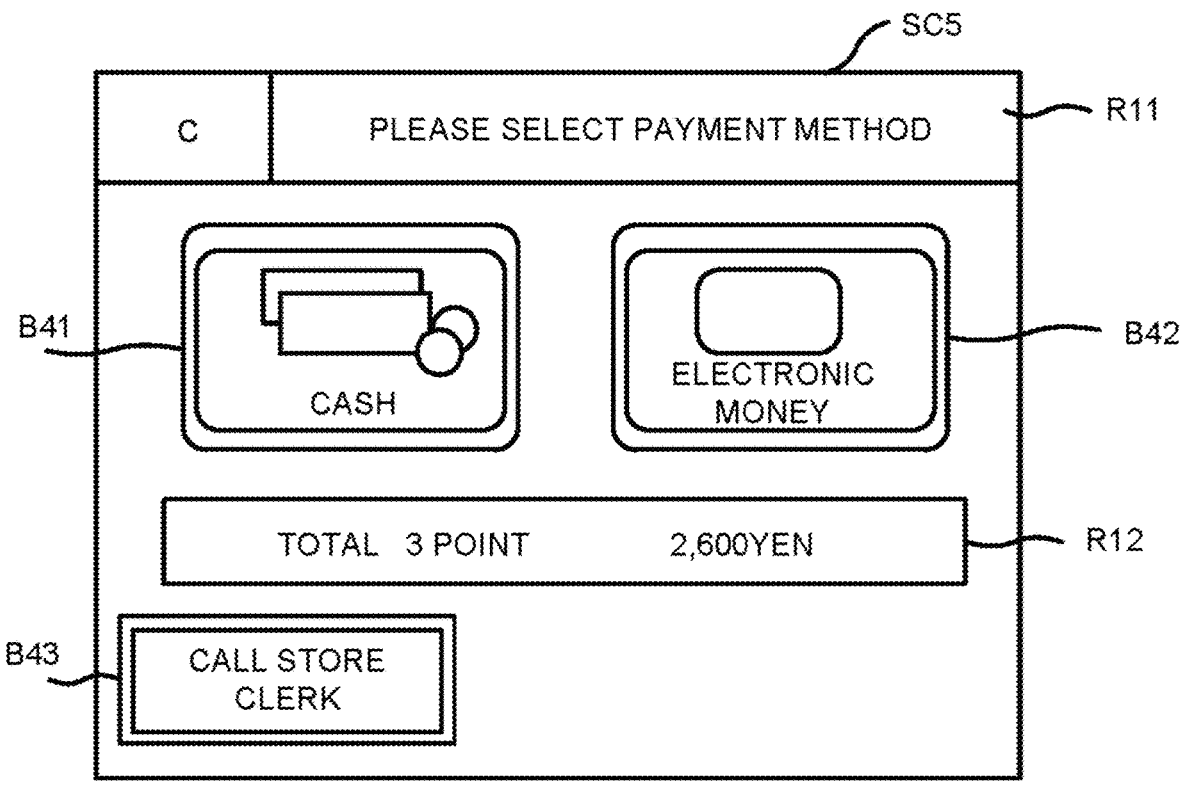
FIG. 11 is a schematic diagram exemplifying a settlement screen displayed on the touch panel of the settlement apparatus.
Figure 12:
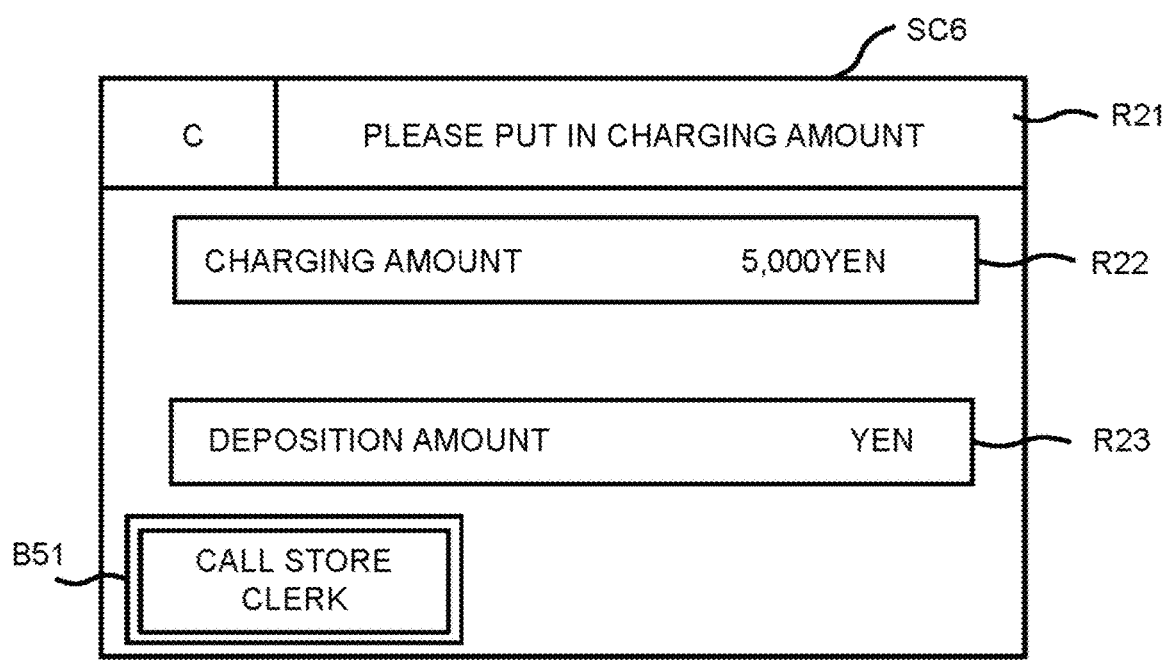
FIG. 12 is a schematic diagram exemplifying a charging request screen displayed on the touch panel of the settlement apparatus.

FIG. 4 and FIG. 5 are flowcharts illustrating the main operations carried out by the CPU 11*a* of the commodity registration apparatus 11 in a control processing according to a control program. FIG. 6-FIG. 9 are schematic diagrams exemplifying various screens displayed on the touch panels 11*g*1 and 11*g*2 of the commodity registration apparatus 11 through the execution of the control processing. FIG. 10 is a flowchart illustrating the main operations carried out by the CPU 12*a* of the settlement apparatus 12 in a control processing according to a control program. FIG. 11-FIG. 12 are schematic diagrams exemplifying various screens displayed on the touch panel 12*g* of the settlement apparatus 12 through the execution of the control processing. The operations of the checkout system 10 are described below with reference to the accompanying drawings. The content of the under-mentioned processing is merely an example, and thus various other processing that can achieve the same result are appropriately applied.

The operations of the commodity registration apparatus 11 are described first.

If the commodity registration apparatus 11 is started in a purchased commodity registration mode, then the CPU 11*a* starts a control processing the procedures of which are shown in FIG. 4. First, the CPU 11*a* clears the transaction memory 31*a* and the total memory 32*a* (Act 1). Then, the CPU 11*a* displays a registration screen on a part of the screen of the touch panel 11*g*1 for store clerk and a part of the screen of the touch panel 11*g*2 for customer (Act 2).

The registration screen indicates the contents stored in the transaction memory 31*a* and the total memory 32*a* so that the process of the registration processing can be confirmed by the store clerk 21 and the customer 2. Further, the CPU 11*a* displays various button images indicating a 'commodity' button, a 'subtotal' button and a 'charge' button and the like in an area other than the registration screen area of the screen on the touch panel 11*g*1 for store clerk. The CPU 11*a* displays the 'charge' button on a part of the screen of the touch panel 11*g*2 for customer. The 'commodity' button is operated by the store clerk 21 to designate a commodity. The 'subtotal' button is operated by the store clerk 21 to instruct the output of a subtotal amount. The 'charge' button is operated by the store clerk to instruct the charging (deposition) of electronic money.

While the registration screen is displayed, the store clerk 21 operates, for example, the scanner 11*f* or the 'commodity' button to sequentially input the commodity code of each commodity purchased by the customer 22. The store clerk 21 touches the 'subtotal' button after input of the commodity code of each purchased commodity is completed.

Further, the store clerk touches the 'charge' button if the customer 22 requests to charge electronic money before touching the 'subtotal' button. Alternatively, the customer 22 may touch the 'charge' button displayed on the touch panel 11*g*2 for customer, instead of touching the 'charge' button by the store clerk.

The CPU 11*a* which displays the registration screen on the touch panel 11*g*1 for store clerk and the touch panel 11*g*2 for customer determines whether or not the commodity code of a commodity to be registered is input (Act 3). If the commodity code is not input (Act 3: No), the CPU 11*a* determines whether or not the 'charge' button is touched (Act 4). In addition to the 'charge' button displayed on the touch panel 11*g*1 for store clerk, the 'charge' button also includes the 'charge' button displayed on the touch panel 11*g*2 for customer. If no 'charge' button is touched (Act 4: No), the CPU 11*a* confirms again whether or not the commodity code of a commodity to be registered is input (Act 3). In this way, the CPU 11*a* waits for the input of a commodity code in Act 3 or a touch operation on the 'charge' button in Act 4.

If the commodity code is input through the scanner 11*f* or the 'commodity' button, then the CPU 11*a* detects the commodity information, for example, the commodity name and the unit price, which is set in the commodity database in association with the commodity code. Further, the CPU 11*a* calculates a sales amount by multiplying a unit price by a sales quantity. Moreover, the CPU 11*a* registers a record including the commodity code, the commodity name, the unit price, the sales quantity, the sales amount and an attribute '0' in the transaction memory 31*a*. Further, the CPU 11*a* separately adds up the sales quantities and the sales amounts in the total memory 32*a* (Act 5). In this way, if the record relating to the commodity sales is registered in the transaction memory 31*a*, then the CPU 11*a* updates the registration screen based on the contents stored in the transaction memory 31*a* and the total memory 32*a* (Act 6).

As described above, CPU 11*a* functions as a storage module which receives the input of data relating to the commodity sales and stores the transaction data (the record the attribute of which is '0') of a settlement target in the transaction memory 31*a* serving as a storage section according to the input data.

The CPU 11*a* carries out a charging processing (Act 7) if the 'charge' button is touched (Act 4: Yes).

FIG. 5 is a flowchart illustrating the detailed operations carried out in a charging processing. To carry out the charging processing, the CPU 11*a* displays a charging screen SC1 (refer to FIG. 6) on the touch panel 11*g*2 for customer (Act 21).

Figure 6:
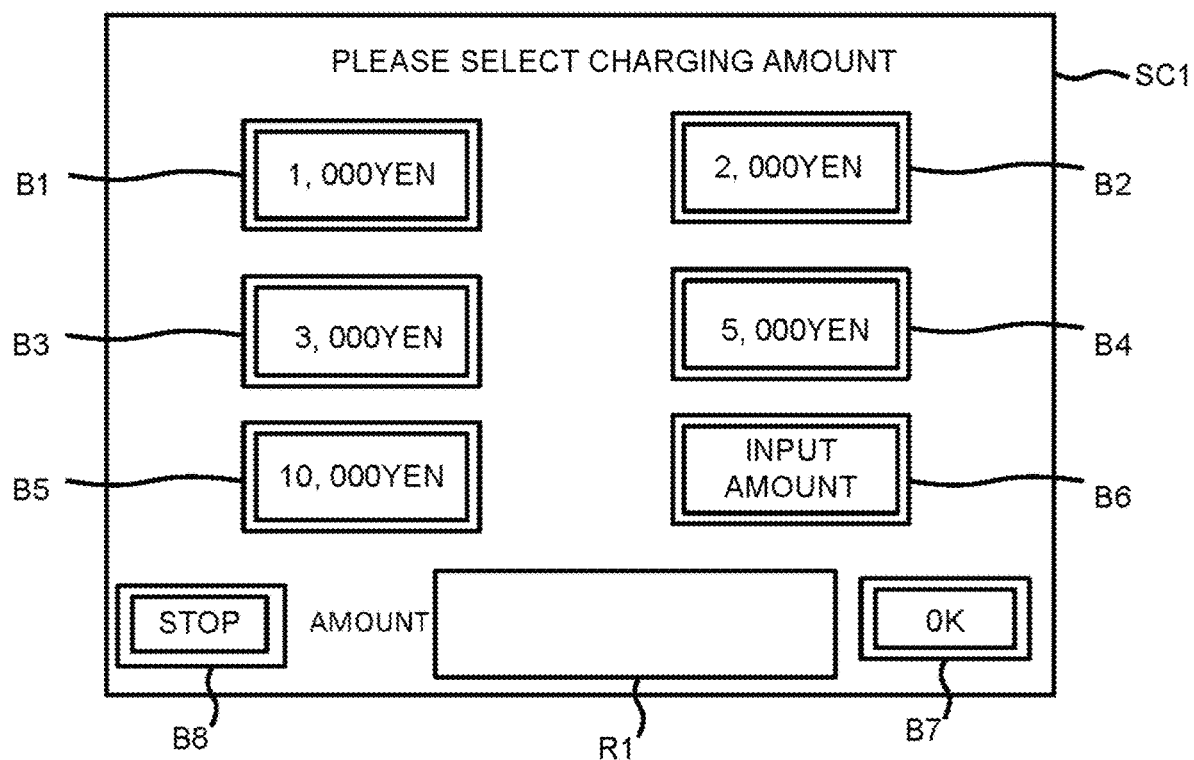
FIG. 6 is a schematic diagram exemplifying a charging screen displayed on the touch panel of the commodity registration apparatus.

FIG. 6 is a schematic diagram exemplifying the charging screen SC1. As shown in FIG. 6, the charging screen SC1 includes a display area R1 and buttons B1-B8.

The button B1 is operated by the customer 22 to designate a charging amount of 1000 Yen. The button B2 is operated by the customer 22 to designate a charging amount of 2000 Yen. The button B3 is operated by to designate a charging amount of 3000 Yen. The button B4 is operated by the customer 22 to designate a charging amount of 5000 Yen. The button B5 is operated by the customer 22 to designate a charging amount of 10000 Yen. The button B6 is operated by the customer 22 to optionally designate a charging amount different from those designated by the buttons B1-B5.

The customer 22 who requests to charge electronic money determines whether or not a desired charging amount is displayed by one of the buttons B1-B5. If the desired charging amount is displayed by one of the buttons B1-B5, the customer 22 touches the button. Otherwise, the customer 22 touches the button B6.

If one of the buttons B1-B5 is touched, then the charging amount set for the button is displayed in the display area R1. To charge the amount displayed in the display area R1, the customer 22 touches the button B7. To stop the charging, the customer 22 touches the button B8.

Figure 7:
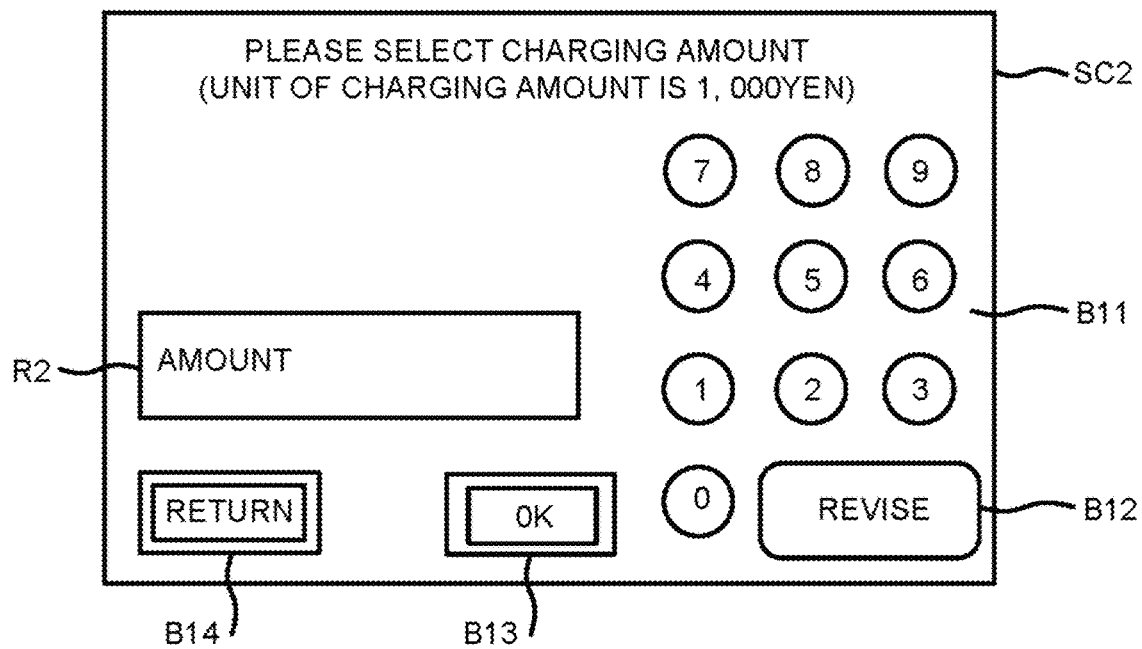
FIG. 7 is a schematic diagram exemplifying an amount input screen displayed on the touch panel of the commodity registration apparatus.

If the button B6 is touched, the CPU 11*a* switches the screen of the touch panel 11*g*2 for customer from the charging screen SC1 to an amount input screen SC2 (refer to FIG. 7).

FIG. 7 is a schematic diagram exemplifying the amount input screen SC2. As shown in FIG. 7, the amount input screen SC2 includes a display area R2, numeric keypad B11 including ten-key buttons '0'-'9' and other buttons B12, B13 and B14.

The numeric keypad B11 is used by the customer 22 to input an optional charging amount. In the present embodiment, the unit of each charging amount is set to 1000 Yen. Further, the maximum charging amount is set to 20000 Yen. In a case of inputting a charging amount of 4000, 6000-9000 or 11000-20000 Yen, the customer 22 presses the ten-key buttons of the numeric keypad B11 to input the number made up of four or more than four digits. For example, if the charging amount is 8000 Yen, then the customer 22 touches the ten-key button '8' of the numeric keypad B11. The CPU 11*a* displays the charging amount input through the numeric keypad B11 in the display area R2.

To modify the amount displayed in the display area R2, the customer 22 touches the button B12. The CPU 11*a* clears the display area R2 if the button B12 is touched. To charge the amount displayed in the display area R2, the customer 22 touches the button B13. If the screen of the touch panel 11*g*2 for customer is changed or returned to the charging screen SC1, the customer 22 touches the button B14.

The CPU 11*a* which causes the touch panel 11*g*2 for customer to display the charging screen SC1 waits for the input of a charging amount (Act 22). If a charging amount 'nn, nnn' is input with the buttons B1-B5 displayed on the charging screen SC1 or the ten-key buttons of the numeric keypad B11 displayed on the amount input screen SC2 (Act 22: Yes), the CPU 11*a* displays the charging amount 'nn, nnn' in the display area R1 or R2 (Act 23). The CPU 11*a* determines whether or not a charging operation is executed (Act 24). The CPU 11*a* deems that the execution of the charging operation is valid if the 'OK' button B7 or B13 displayed on the charging screen SC1 or the amount input screen SC2 is touched. The CPU 11*a* deems that the execution of the charging operation is invalid if the 'cancel' button B8 displayed on the charging screen SC1 is touched.

If a charging operation is executed (Act 24: Yes), the CPU 11a registers the record including the commodity code '999999999', the commodity name 'charge', the unit price 'nn, nnn', the quantity '1', the amount 'nn, nnn' and the attribute '1' in the transaction memory 31a. Further, the CPU 11a adds up the quantities and the amounts in the total memory 32a (Act 25). In this way, if a record relating to the charging amount is registered in the transaction memory 31a, then the CPU 11a updates the registration screen according to the contents stored in the transaction memory 31a and the total memory 32a (Act 26).

If the charging operation is not executed (ACT 24: No), the CPU 11a does not execute the processing of Act 25 and Act 26. Then, the charging processing is ended.

As described above, the CPU 11a functions as an addition module which receives the input of a charging amount for the electronic money and adds the data of the input charging amount in the transaction memory 31a.

Returning to FIG. 4, after the registration screen is updated in Act 6 or Act 26, the CPU 11a determines whether or not the 'subtotal' button is touched (Act 8). If the 'subtotal' button is not touched (Act 8: No), the CPU 11a waits again for the input of a commodity code or a touch operation on the 'charge' button (Act 3, Act 4).

If a commodity code is input while the CPU 11a is in the standby state described in Act 3 or Act 4 (Act 3: Yes), then the CPU 11a carries out the processing in Acts 5 and 6. The CPU 11a carries out the charging processing in Act 7 if the 'charge' button is touched (Act 4: Yes).

If the 'subtotal' button is touched (Act 8: Yes), the CPU 11a generates settlement information according to the contents stored in the transaction memory 31a and the total memory 32a as of the time the 'subtotal' button is operated (Act 9). Moreover, the CPU 11a displays a transmission destination selection screen SC3 (refer to FIG. 8) on a part of the screen of the touch panel 11g1 for store clerk (Act 10).

Figure 8:
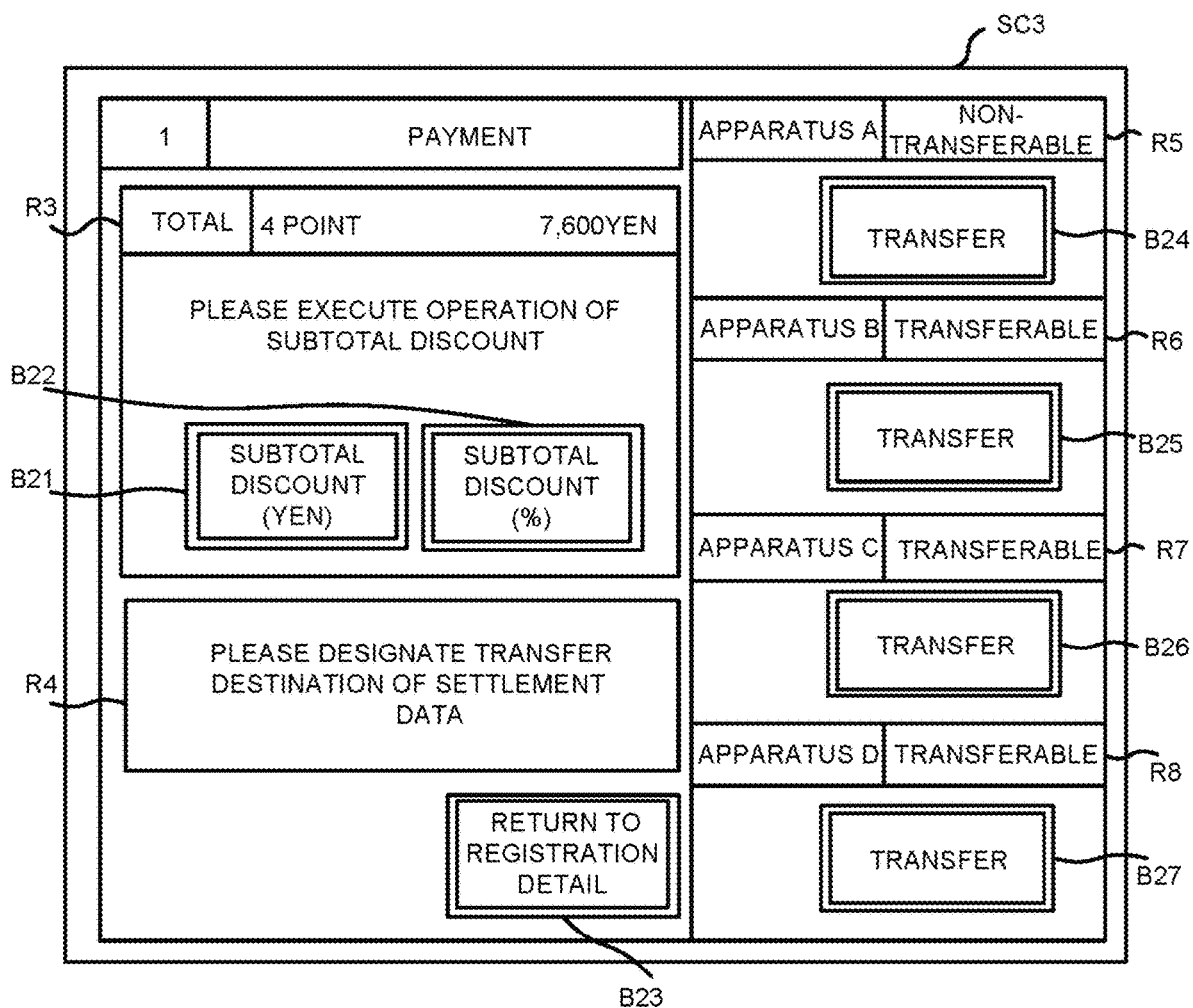
FIG. 8 is a schematic diagram exemplifying a transmission destination selection screen displayed on the touch panel of the commodity registration apparatus.

FIG. 8 exemplifies a transmission destination selection screen SC3. The transmission destination selection screen SC3 includes display areas R3-R8 and buttons B21-B25 and buttons B6 and B7.

The total quantity and the total amount stored in the total memory 32a are displayed in the display area R3. Various messages are displayed in the display area R4. The buttons B21 and B22 are operated by the store clerk 21 to designate applicable discount for the total amount. The button B23 is operated by the store clerk 21 to designate returning a part of the screen of the touch panel 11g1 for store clerk to the registration screen SC1.

The display areas R5-R8 respectively display whether or not the settlement information can be transmitted to four settlement apparatuses 12. The buttons B24-B27 are operated by the store clerk 21 to respectively designate the transmission of settlement information to the four settlement apparatuses 12. In the execution of a settlement processing, the settlement apparatus 12 refuses to receive the settlement information. Message 'transmission rejected' is displayed in the one or more of the display areas R5-R8 which is associated with the settlement apparatus 12 in a settlement information rejection state. Contrarily, message 'transmission permitted' is displayed in the one or more of the display areas R5-R8 which is associated with a settlement apparatus 12 in a settlement information reception state. Further, the buttons B24-B27 may be displayed in different manners based on whether or not the associated settlement apparatuses 12 can receive settlement information. Alternatively, the one or more of the buttons B24-B27 associated with a settlement apparatus 12 in a settlement information rejection state may not be displayed.

If the transmission destination selection screen SC3 is displayed, the CPU 11a waits for the designation of a settlement apparatus 12 which is the transmission destination of the settlement information (Act 11). The CPU 11a in the standby state confirms the occurrence of other event such as the execution of another operation and may carry out a processing corresponding to the other event. For example, if either of the buttons B21 and B22 is touched by the store clerk 21, then the CPU 11a changes the total amount contained in the settlement information according to an instruction given by the store clerk 21 thereafter.

The store clerk 21 who confirms the transmission destination selection screen SC3 determines, according to the information of the display areas R5-R8, a settlement apparatus 12 to which the transaction data is transmitted. Moreover, the store clerk touches one of the buttons B24-B27 corresponding to the settlement apparatus 12 determined as a transmission destination.

If one of the buttons B24-B27 displayed on the transmission destination selection screen SC3 is touched while the CPU 11a is in the standby state described in Act 11, then the CPU 11a deems that a settlement apparatus 12 is designated. If a settlement apparatus 12 is designated (Act 11: Yes), the CPU 11a outputs the settlement information to the designated settlement apparatus 12 (Act 12).

Specifically, the CPU 11a controls the communication unit 11j to output the settlement information to the LAN 13 by taking the communication address set for the designated settlement apparatus 12 as a transmission destination address and the communication address set for the commodity registration apparatus 11 as a transmission source address. In this way, the settlement information for which a transmission destination address and a transmission source address are set is sent via the LAN 13. Then, the settlement information is received by the settlement apparatus 12 the communication address of which is identical to the transmission destination address. The settlement apparatus 12 which receives the settlement information stores the transmission source address of the settlement information to determine the commodity registration apparatus from which the settlement is originally sent.

In this way, the CPU 11a functions as a selection module which selects a settlement apparatus from a plurality of settlement apparatuses 12. Further, the CPU 11a and the communication unit 11j function as an output module which outputs the data stored in the transaction memory 31a to the selected settlement apparatus 12 if an input termination instruction for data relating to commodity sales is received.

If the settlement information is output, then the CPU 11a displays a notification screen SC4 (refer to FIG. 9) on a part of the screen of the touch panel 11g1 for store clerk and on a part of the screen of the touch panel 11g2 for customer (Act 13). FIG. 9 is a schematic diagram exemplifying the notification screen SC4. The notification screen SC4 includes display areas R9 and R10 and a button B31 which is only displayed on the touch panel 11g1 for store clerk. The button B31 is not displayed on the touch panel 11g2 for customer.

An image is displayed on the display area R9 to cause the store clerk 21 and the customer 22 to recognize the selection of a semi-self-service settlement. The semi-self-service settlement refers to a settlement mode in which a settlement processing is carried out in the settlement apparatus 12 according to the operation of the customer 22. The display area R10 displays the total quantity and the total amount contained in the settlement information and the one of the four settlement apparatuses 12 to which the settlement information containing the total quantity and the total amount is transmitted, also. The button B31 is operated by the store clerk 21 to give an instruction for closing the notification screen SC4. The CPU 11a ends the information processing the procedures of which are shown in FIG. 4 in response to the touch operation on the button B31. The CPU 11a repeats the processing subsequent to Act 1 in the same way as described above.

Further, the CPU 11a does not determine that 'Yes' is taken in Act 11 if one or more of the touch buttons B24-B27 associated with settlement apparatuses 12 that does not receive the settlement information is touched. Consequentially, the CPU 11a rejects the designation for the settlement apparatus 12 that does not receive the settlement information. Therefore, if all the settlement apparatuses 12 are in an inactivated state or in an active state in which the settlement apparatus 12 does not receive settlement information, then the CPU 11a spends no time in waiting for the designation for a settlement apparatus 12.

The store clerk 21 who confirms the notification screen SC4 notifies the customer 22 that the settlement processing can be carried out at the settlement apparatus 12 displayed in the display area R10. Alternatively, a sheet on which the number of the settlement apparatus displayed in the display area R10 is printed may be output through the printer 11h of the commodity registration apparatus 11 and handed over to the customer 22. The customer 22 who receives the notification goes to the designated settlement apparatus 12 to execute a settlement processing.

The operations of the settlement apparatus 12 are described below.

If the settlement apparatus 12 is started, the CPU 12a starts a control processing the procedures of which are shown in FIG. 10. First, the CPU 12a displays a standby screen on the screen of the touch panel 12g (Act 31). The standby screen indicates that no settlement processing is being carried out by the settlement apparatus 12 and thus any type of information may be displayed on the standby screen. For example, the standby screen displays a message 'settlement processing cannot be executed' or an optional image such as an advertisement image as a screen saver. After displaying the screen of the touch panel 12a as a standby screen, the CPU 12a waits for receiving the settlement information (Act 32).

As stated above, the CPU 11a of the commodity registration apparatus 11 sends the settlement information from the communication unit 11j to the LAN 13 in Act 12 shown in FIG. 4. The settlement information is received by the communication unit 12j of the settlement apparatus 12 instructed as the transmission destination of the settlement information.

If the settlement information is received (Act 32: Yes), the CPU 12a develops the settlement information in the transaction memory 31b and the total memory 32b (Act 33). In other words, the CPU 12a stores a record containing the commodity name, the unit price, the sales quantity, the sales amount and the attribute included in the settlement information is stored in the transaction memory 31b. Similarly, the CPU 12a stores the total quantity and the total amount included in the settlement information in the total memory 32b.

If the settlement information is developed in the transaction memory 31b and the total memory 32b, then the CPU 12a determines whether or not the records developed in the transaction memory 31b include a record relating to a charging amount (Act 34). The CPU 12a checks the attribute of each of the records developed on the transaction memory 31b. If a record the attribute in which is '1' is detected, then the CPU 12a determines that a record relating to a charging amount is included in the records developed in the transaction memory 31b. If the attribute of each record developed in the transaction memory 31b is '0', then the CPU 12a determines that no record relating to a charging amount is included in the records developed in the transaction memory 31b.

If no record relating to a charging amount is included in the records developed on the transaction memory 31b (Act 34: No), the CPU 12a displays a settlement screen SC5 (refer to FIG. 11) on a part of the screen of the touch panel 12g (Act 35).

FIG. 11 exemplifies the settlement screen SC5. The settlement screen SC5 includes display areas R11 and R12 and buttons B41-B43. In the display area R11, operation guidance is displayed to instruct the customer 22 who operates the settlement apparatus 12 to select a settlement method. In the display area R12, the total quantity and the total amount stored in the total memory 32b are displayed as a transaction quantity and a transaction amount for the customer 22. The button B11 is operated by the customer 22 to designate a cash settlement method. The button B12 is operated by the customer 22 to designate an electronic money settlement method. The button B13 is operated by the customer 22 to call the store clerk 21.

The customer 22 who confirms the settlement screen SC5 determines to settle the transaction with cash or electronic money. To settle the transaction with cash, the customer 22 touches the button B41 and deposits cash equal to or more than the total amount into the automatic change machine 12e. To settle the transaction with electronic money, the customer 22 touches the button B42 and then the card reader/writer 12i reads the data stored in an electronic money card in response to the touch operation.

Although, a cash settlement method and an electronic money settlement method are exemplarily displayed on the settlement screen SC5, a transaction is not limited to be settled with those two methods. The settlement apparatus 12 may settle a transaction with another settlement method such as a credit card settlement or a commodity coupon settlement.

The CPU 12a which displays the settlement screen SC5 waits for a touch operation on the button B41 corresponding to the cash settlement or the button B42 corresponding to the electronic money settlement (Act 36). If the button B41 or B42 is touched (Act 36: Yes), the CPU 12a carries out a settlement processing according to the settlement method selected by the button B41 or B42 which is touched (Act 37). If the button B41 is touched, the CPU 12a carries out a settlement processing for the transaction generating the total amount on condition that cash equal to or more than the total amount is deposited to the automatic change machine 12e. If the button B42 is touched, the CPU 12a carries out a settlement processing for the total amount of the transaction on condition that the balance of electronic money read from the electronic money card is greater than the total amount. The above-described settlement processing is a well-known settlement processing executed in a conventional self-service POS terminal and is therefore not described repeatedly.

As described above, the CPU 12a functions as a processing module which receives the input of a payment amount and carries out a settlement processing for the transaction on condition that the payment amount greater than the total amount of the transaction is input.

If the settlement processing is ended, the CPU 12*a* edits the print data to be printed on a receipt according to the contents stored in the transaction memory 31*b* and the total memory 32*b*. The CPU 12*a* activates the printer 12*h* to issue a receipt (Act 38). After a receipt is issued, the CPU 12*a* ends the information processing the procedures of which are shown in FIG. 10. The CPU 12*a* repeats the processing subsequent to Act 31 in the same way as described above.

On the other hand, if a record relating to a charging amount is included in the records developed in the transaction memory 31*b* (Act 34: Yes), the CPU 12*a* displays a charging request screen SC6 (refer to FIG. 12) on a part of the screen of the touch panel 12*g* (Act 39).

FIG. 12 exemplifies the charging request screen SC6. The charging request screen SC6 includes display areas R21-R23 and a button B51. In the display area R21, operation guidance is displayed to instruct the customer 22 who operates the settlement apparatus 12 to deposit a charging amount in cash. In the display area R22, the charging amount contained in the record relating to a charging amount is displayed. If a plurality of records relating to a charging amount is included in the records developed in the transaction memory 31*b*, then the total of the charging amounts contained in the records is displayed in the display area R22. In the display area R23, the amount of the money inserted into the automatic change machine 12*e* is displayed. The button B51 is operated by the customer 22 to call the store clerk 21, as described above.

The customer 22 who confirms the charging request screen SC6 uses the card reader/writer 12*i* to read the data of an electronic money card and deposits cash equal to or more than the charging amount into the automatic change machine 12*e*.

The CPU 12*a* which displays the charging request screen SC6 waits for until cash is inserted into the automatic change machine 12*e* (Act 40). If cash is inserted (deposited) into the automatic change machine 12*e* (Act 40: Yes), the CPU 12*a* displays the deposited cash amount on the display area R23. Moreover, the CPU 12*a* determines whether or not the deposited cash amount displayed in the display area R23 exceeds the charging amount displayed in the display area R22 (Act 41). If the deposited cash amount is less than the charging amount (Act 41: No), the CPU 12*a* continues to wait for the deposition of cash into the automatic change machine 12*e* (Act 40).

If the deposited cash amount becomes greater than the charging amount (Act 41: Yes), the CPU 12*a* waits for until the data of the electronic money card is read by the card reader/writer 12*i* (Act 42). If the data of the electronic money card is read (Act 42: Yes), then the CPU 12*a* adds the charging amount to the balance of the electronic money contained in the data of the electronic money card (Act 43). Further, the CPU 12*a* deducts the charging amount from the total amount stored in the total memory 32*b*. The CPU 12*a* subtracts the number of records relating to a charging amount from the total quantity stored in the total memory 32*b* (Act 44).

As described above, the CPU 12*a* functions as a charging module which adds a charging amount to the balance of electronic money through the card reader/writer 12*i* on condition that a payment amount more than the charging amount is deposited with a settlement method other than the electronic money settlement method if the data, stored in the transaction memory 31*a*, which is output from the commodity registration apparatus 11 includes data of the charging amount. Specifically, if the data output from the commodity registration apparatus 11 includes data of the charging amount, the CPU 12*a* adds the charging amount to the balance of the electronic money with the card reader/writer 12*i* on condition that a payment amount more than the charging amount is deposited with a settlement method other than the electronic money settlement method and then updates the transaction amount by deducting the charging amount from the transaction amount.

If the charging of the electronic money is completed, the CPU 12*a* determines whether or not change is required with respect to the charging amount (Act 45). If the deposited amount is greater than the charging amount, the CPU 12*a* determines that change is required. If the deposited amount is equal to the charging amount, the CPU 12*a* determines that no change is required.

If the change is required (Act 45: Yes), the CPU 12*a* instructs the automatic change machine 12*e* to pay out the difference between the deposited amount and the charging amount as change (Act 46). The automatic change machine 12*e* dispenses change according to the instruction.

After the automatic change machine 12*e* is instructed to dispense change or in a case in which change is not required (Act 45: No), the CPU 12*a* displays the settlement screen SC5 (refer to FIG. 11) on a part of the screen of the touch panel 12*g* (Act 35). Then, the CPU 12*a* repeats the processing in Act 35-Act 38 in the same way as described above.

In a store in which the checkout system 10 described above is introduced, the customer 22 who wants to charge money as an electronic money in the electronic money card proffers charging of electronic money to the store clerk 21 when settling the purchased commodities. The store clerk 21 who accepts the charging request touches the 'charge' button before completing the registration of the purchased commodities to the commodity registration apparatus 11.

If the 'charge' button is touched, then the charging screen SC1 is displayed on the touch panel 11*g*2 for customer of the commodity registration apparatus 11. The customer 22 who confirms the charging screen SC1 inputs a charging amount desired. After the charging amount is input, a record relating to the charging amount is stored in the transaction memory 31*a* of the commodity registration apparatus 11. A record relating to the purchased commodity is also registered in the transaction memory 31*a*.

In the transaction memory 31*a* shown in FIG. 3, records RC1, RC2 and RC3 generated in a case in which the customer 22 who purchases a commodity A a unit price of which is 600 Yen and two commodities B a unit price of which is 1000 Yen inputs a charging amount of 5000 Yen are stored. In this state, if the store clerk 21 touches the 'subtotal' button, then the transmission destination selection screen SC3 shown in FIG. 8 is displayed on the touch panel 11*g*1 for store clerk. If the store clerk 21 selects the settlement apparatus 'C' 12 within four settlement apparatuses 'A', 'B', 'C' and 'D' as a transmission destination, and then the button B26 is touched, settlement information generated according to the contents stored in the transaction memory 31*a* and the total memory 32*a* is transmitted to the settlement apparatus 'C' 12. Further, the notification screen SC4 shown in FIG. 9 is displayed on the touch panel 11*g*1 for store clerk and the touch panel 11*g*2 for customer. Thus, the customer 22 goes to the settlement apparatus 'C' 12 to execute a settlement operation.

At this time, the charging request screen SC6 shown in FIG. 12 is displayed on the touch panel 12*g* of the settlement apparatus 'C' 12. This is because that the record RC2 relating to the charging amount is included in the settlement information transmitted to the settlement apparatus 'C' 12. Thus, the customer 22 first deposits the charging amount '5000 Yen' to the automatic change machine 12e and holds his or her electronic money card over the card reader/writer 12i. If 10000 Yen is deposited by the customer 22, for example, then a change amount of 5000 Yen is dispensed from the automatic change machine 12e. If the charging amount of just 5000 Yen is deposited, then 5000 Yen is added to the balance of the electronic money stored in the electronic money card. For example, if the balance is 600 Yen before the charging, then the balance is increased to 5600 Yen through the charging.

After the charging of electronic money is completed, the settlement screen SC5 shown in FIG. 11 is displayed on the touch panel 12g of the settlement apparatus 'C' 12. In this case, the transaction amount displayed in the display area R12 is 2600 Yen (total settlement amount) but not 5000 Yen (charge amount), and then the customer 22 selects a settlement method. In a case of settling the transaction with cash, the customer 22 touches the button B41 and puts cash equal to or more than the total amount '2600 Yen' into the automatic change machine 12e. In a case of settling the transaction with electronic money, the customer 22 touches the button B42 and holds the electronic money card over the card reader/writer 12i. If the customer 22 selects to settle the transaction with electronic money, then after the transaction amount 2600 is paid, the balance of the electronic money card is 3000 Yen.

Thus, according to the checkout system 10 of the first embodiment, the customer 22 can charge electronic money before the transaction relating to the sales of the commodities is settled in the settlement apparatus 12, even after the data of the purchased commodity is input to the commodity registration apparatus 11.

Second Embodiment

Next, a second embodiment is described.

In the first embodiment, in a case in which a record relating to a charging amount is included in settlement information, cash of the charging amount is charged in the electronic money card as an electronic money in the settlement apparatus 12 first, and then a transaction amount calculated based on a record relating to the sales of the commodities is settled. In the second embodiment, if a record relating to the charging amount is included in settlement information, the charging of cash to the electronic money and the settlement for a transaction amount calculated based on a record relating to the sales of the commodity are collectively carried out in the settlement apparatus 12.

Operations in the information processing carried out by the settlement apparatus 12 in the second embodiment are different from those carried out by the settlement apparatus 12 in the first embodiment. Remaining operations in the information processing in the second embodiment are similar to those in the first embodiment. Thus, FIG. 1-FIG. 9 are also used in the descriptions in the second embodiment and therefore the description thereof are not repeated.

Figure 13:
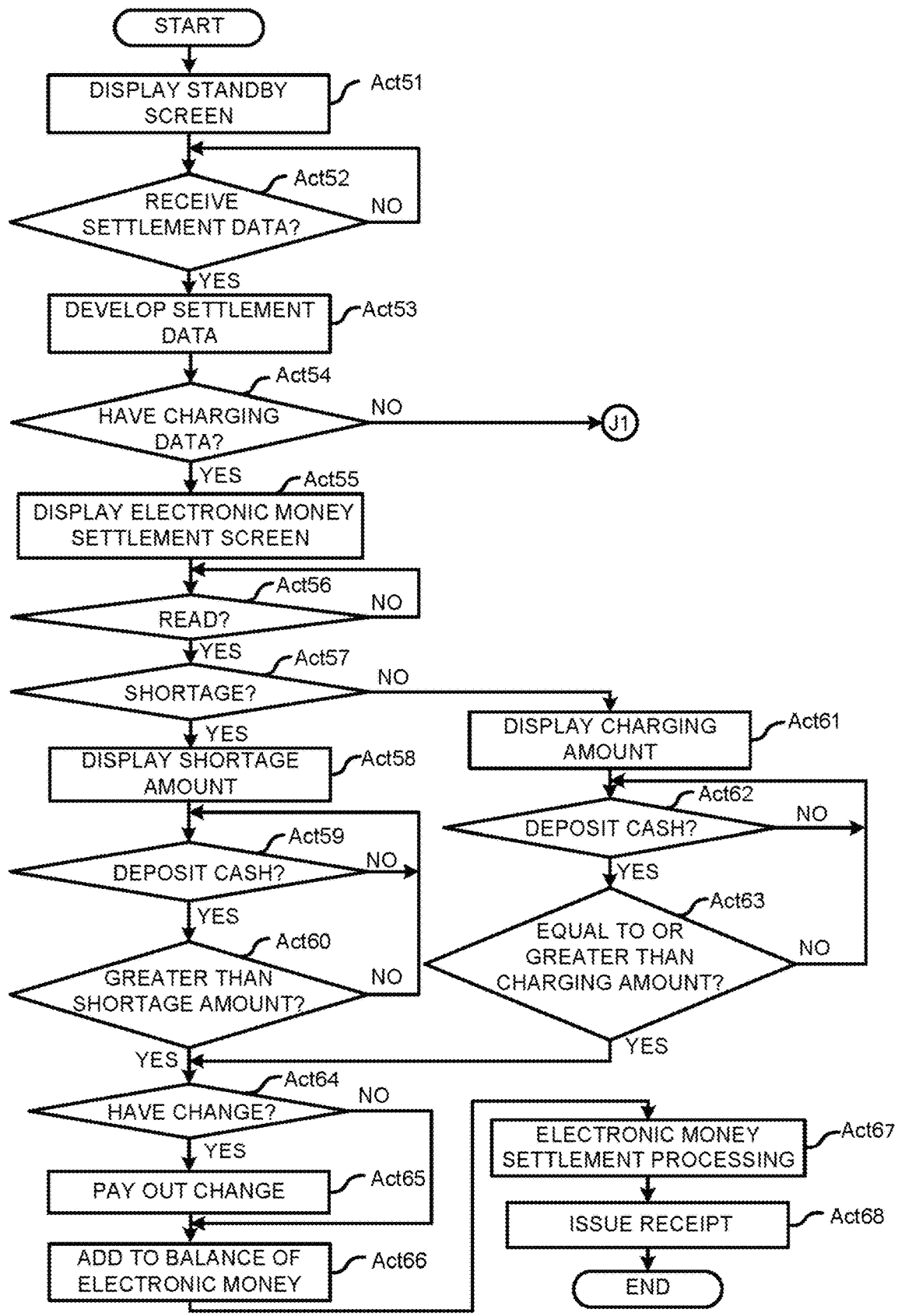
FIG. 13 is a flowchart illustrating the main operations carried out by the CPU of a settlement apparatus in a control processing according to a control program in a second embodiment.
Figure 14:
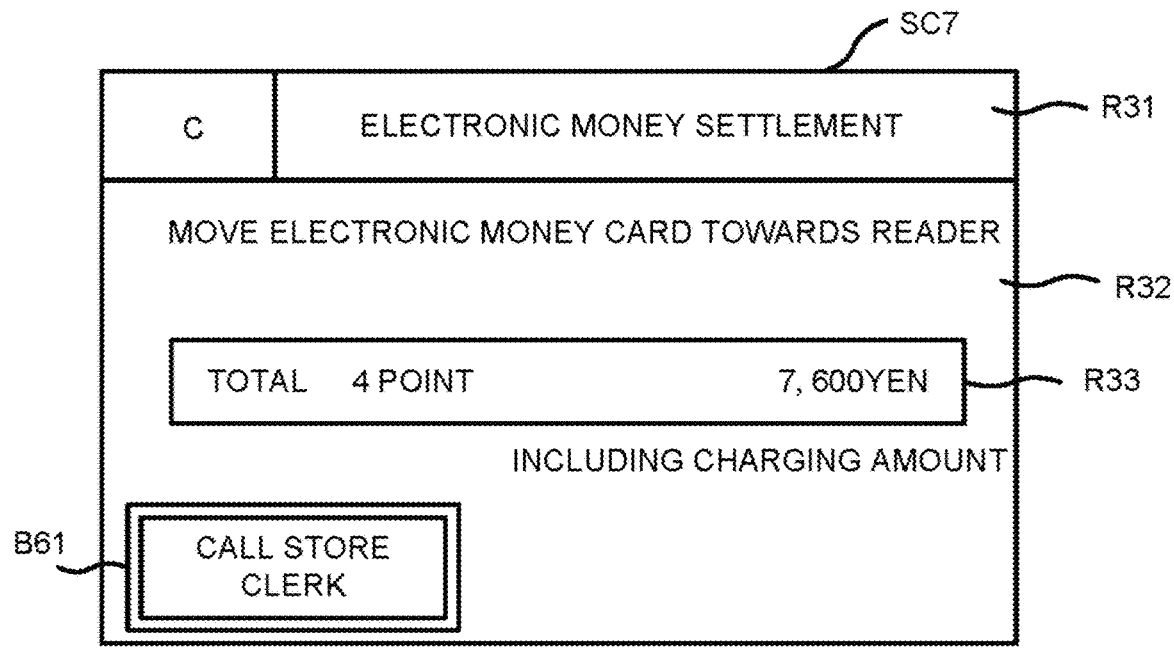
FIG. 14 is a schematic diagram exemplifying a settlement screen displayed on the touch panel of the settlement apparatus in the second embodiment.
Figure 15:
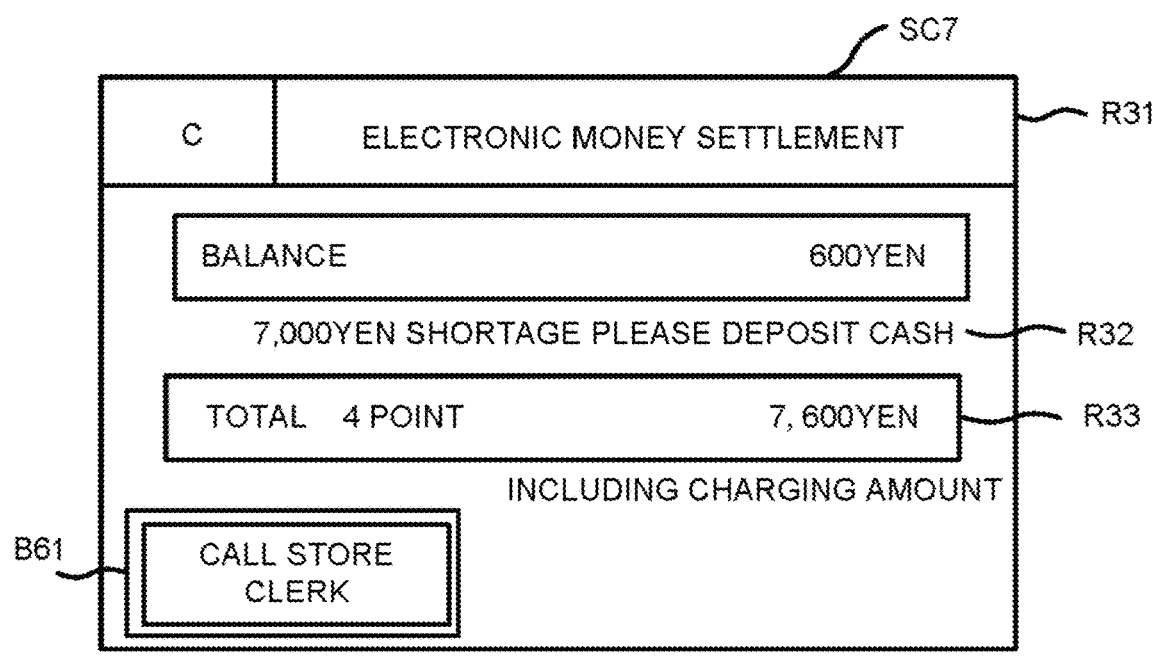
FIG. 15 is a schematic diagram exemplifying a settlement screen displayed when the balance of electronic money is less than a transaction amount.
Figure 16:
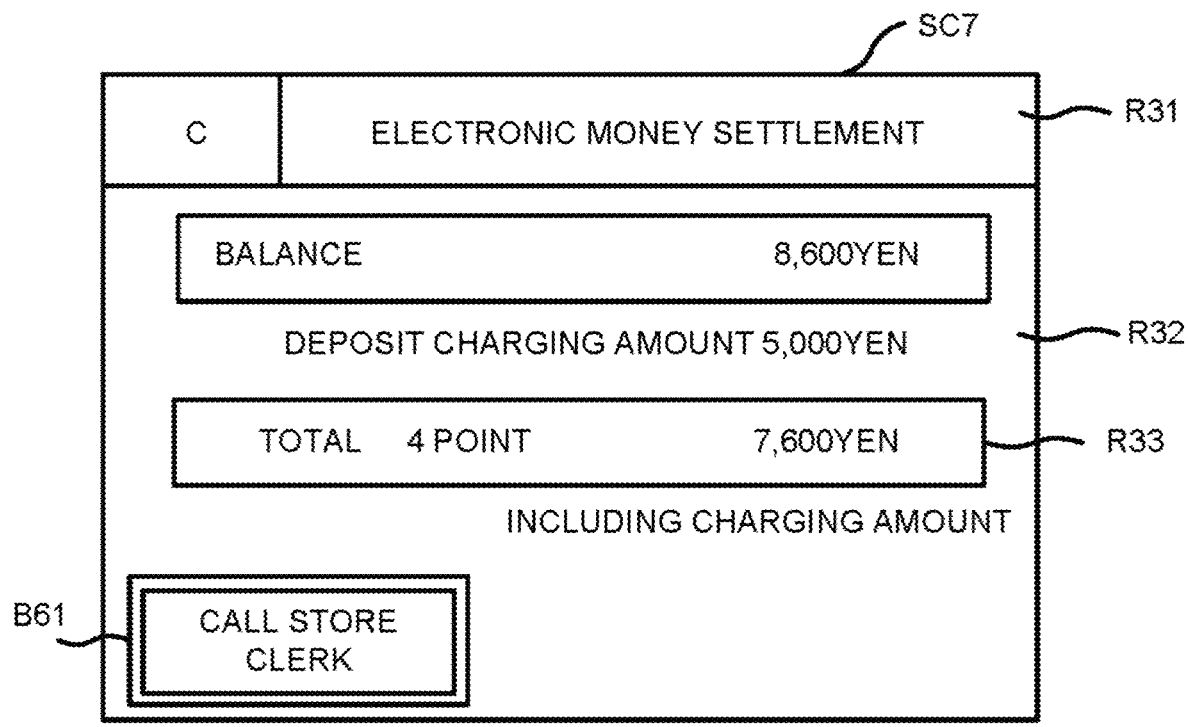
FIG. 16 is a schematic diagram exemplifying a settlement screen displayed when the balance of electronic money is enough for a transaction amount.

FIG. 13 is a flowchart illustrating the main operations carried out by the CPU 12a of the settlement apparatus 12 in a control processing according to a control program in the second embodiment. FIG. 14-FIG. 16 are schematic diagrams exemplifying the screens displayed on the touch panel 12g of the settlement apparatus 12 through the execution of the control processing. The operations carried out by the checkout system 10 in the second embodiment are described below with reference to the accompanying drawings. Contents of the processing described below are merely examples, various other processing that can achieve the same result as that in the second embodiment are appropriately applied.

If the settlement apparatus 12 is activated, the CPU 12a starts a control processing the procedures of which are shown in FIG. 13. First, the CPU 12a displays a standby screen on the touch panel 12g (Act 51). After displaying the standby screen on the touch panel 12g, the CPU 12a waits for the reception of settlement information (Act 52). If the settlement information is received (Act 52: Yes), the CPU 12a develops the settlement information in the transaction memory 31b and the total memory 32b (Act 53). After the settlement information is developed in the transaction memory 31b and the total memory 32b, the CPU 12a determines whether or not a record relating to a charging amount is included in the records developed on the transaction memory 31b (Act 54). If no record relating to a charging amount is included in the records developed on the transaction memory 31b (Act 54: No), the CPU 12a displays the settlement screen SC5 on a part of the screen of the touch panel 12g (Act 35 shown in FIG. 10). Then, the CPU 12a repeats the processing in Act 35-Act 38 shown in FIG. 10 in the same way as described above.

On the other hand, if a record relating to a charging amount is included in the records developed on the transaction memory 31b (Act 54: Yes), the CPU 12a displays a settlement screen SC7 (refer to FIG. 14) for electronic money on a part of the screen of the touch panel 12g (Act 55).

FIG. 14 exemplifies the settlement screen SC7. The settlement screen SC7 includes display areas R31-R33 and a button B61. The display area R31 is used to notify the customer 22 who operates the settlement apparatus 12 of the settlement of a transaction with electronic money. In the display area R32, operation guidance for a settlement with electronic money is displayed to the customer 22. In the display area R33, the total quantity and the total amount stored in the total memory 32b are displayed as a transaction quantity and a transaction amount for the customer 22. The button B61 is operated by the customer 22 to call the store clerk 21.

The customer 22 who confirms the settlement screen SC7 shown in FIG. 14 uses the card reader/writer 12i to read the data of his or her electronic money card.

The CPU 12a displaying the settlement screen SC7 waits for until the data of the electronic money card is read by the card reader/writer 12i (Act 56). If the data of the electronic money card is read (Act 56: Yes), then the CPU 12a compares the balance of electronic money contained in the data of the electronic money card with the total amount stored in the total memory 32b to confirm whether or not the balance is smaller than the total amount (Act 57).

If the balance is smaller than the total amount (Act 57: Yes), the CPU 12a displays a shortage amount in the display area R32 of the settlement screen SC7 (Act 58). The shortage amount is calculated by deducting the balance from the total amount.

FIG. 15 is a diagram illustrating a settlement screen SC7 in a case in which the shortage amount between the balance of electric money (600 Yen) and the transaction amount (7600 Yen) is 7000 Yen. In this case, the balance of electronic money and a guidance of instructing the customer to deposit the shortage amount are displayed in the display area R32 of the settlement screen SC7.

The customer 22 who confirms the settlement screen SC7 shown in FIG. 15 deposits cash equal to or greater than the shortage amount to the automatic change machine 12e.

The CPU 12*a* displaying the shortage amount waits for the deposition of cash to the automatic change machine 12*e* (Act 59). If cash is deposited (Act 59: Yes), the CPU 12*a* determines whether or not the amount of the cash deposited is greater than the shortage amount (Act 60). If the amount of the cash deposited is smaller than the shortage amount (Act 60: No), the CPU 12*a* continues to wait for further deposition of cash to the automatic change machine 12*e* (Act 59).

If the amount of the cash deposited becomes greater than the shortage amount (Act 60: Yes), the CPU 12*a* carries out the processing in Act 64.

On the other hand, if the balance is greater than the total amount (Act 57: No), the CPU 12*a* displays the charging amount contained in one record relating to a charging amount among the records developed in the transaction memory 31*b* in the display area R32 of the settlement screen SC7 (Act 61). If a plurality of records relating to a charging amount is included in the records developed in the transaction memory 31*b*, then the total of the charging amounts contained in the records is displayed in the display area R32.

FIG. 16 is a diagram illustrating the settlement screen SC7 in a case in which no shortage amount is present between the balance of electric money (8600 Yen) and the transaction amount (7600 Yen). In this case, the balance of electronic money and a guidance instructing the deposition of cash are displayed in the display area R32 of the settlement screen SC7.

The customer 22 who confirms the settlement screen SC7 shown in FIG. 16 deposits cash equal to or greater than the charging amount to the automatic change machine 12*e*.

The CPU 12*a* which displays the charging amount waits for the deposition of cash to the automatic change machine 12*e* (Act 62). If cash is deposited (Act 62: Yes), the CPU 12*a* determines whether or not the amount of the cash deposited is equal to or greater than the charging amount (Act 63). If the amount of the cash deposited is smaller than the charging amount (Act 63: No), the CPU 12*a* continues to wait for the deposition of further cash to the automatic change machine 12*e* (Act 62).

If the amount of the cash deposited is equal to or greater than the charging amount (Act 63: Yes), the CPU 12*a* carries out the processing in Act 64.

In Act 64, the CPU 12*a* determines whether or not change is required. If the amount of the cash deposited is greater than the shortage amount or the charging amount, the CPU 12*a* determines that the change is required. If the amount of the cash required is equal to the shortage amount or the charging amount, the CPU 12*a* determines that no change is required.

If change is required (Act 65: Yes), the CPU 12*a* instructs the automatic change machine 12*e* to dispense cash, as change, in an amount equal to the difference between the deposition amount and the shortage amount or the charging amount (Act 65). The automatic change machine 12*e* pays out the change according to the instruction.

After the instruction is sent to the automatic change machine 12*e* or if no change is required (Act 64: No), the CPU 12*a* adds the charging amount or the shortage amount to the balance of electronic money contained in the data of the electronic money card using the card reader/writer 12*i* (Act 66). As stated above, the charging amount is the same contained in one record relating to a charging amount among the records developed in the transaction memory 31*b*. If a plurality of records relating to a charging amount is included in the records developed in the transaction memory 31*b*, then the total of the charging amounts contained in the records is added to the balance.

If the charging of electronic money is completed, the CPU 12*a* carries out a settlement processing with electronic money (Act 67). The CPU 12*a* carries out a settlement processing for the transaction which results the total amount, on condition that the balance of electronic money read from the electronic money card by the card reader/writer 12*i*, including the added shortage amount or charging amount, is equal to or greater than the total amount stored in the total memory 32*b*. The settlement processing is the well-known settlement processing executed in a conventional self-service POS terminal and therefore the description thereof is not repeated.

If the settlement processing is ended, the CPU 12*a* edits the print data to be printed on a receipt according to the contents stored in the transaction memory 31*b* and the total memory 32*b*. The CPU 12*a* activates the printer 12*h* to issue a receipt (Act 68). After the receipt is issued, the CPU 12*a* ends the information processing the procedures of which are shown in FIG. 13. Moreover, the CPU 12*a* repeats the processing subsequent to Act 51 in the same way as described above.

If a record relating to a charging amount is included in the settlement information, the CPU 12*a* waits for until the balance of electronic money is read by the card reader/writer 12*i*. As stated above, the CPU 12*a* functions a charging module which waits for the deposition of a shortage amount in cash if the balance is smaller than a transaction amount calculated according to the settlement information and adds a charging amount to the balance of electronic money with the card reader/writer 12*i* on condition that deposited amount in cash more than the shortage amount is received. In this case, the CPU 12*a* settles the transaction according to the balance of electronic money which is updated with the charging amount.

Further, the CPU 12*a* functions as a charging module which waits for the deposition of a charging amount in cash if the balance is greater than the transaction amount and adds the shortage amount to the balance of electronic money with the card reader/writer 12*i* on condition that deposited amount in cash equal to or more than the shortage amount is received. In this case also, the CPU 12*a* settles the transaction according to the balance of electronic money which is updated with the shortage amount.

In a store in which the checkout system 10 described above is introduced also, the processing carried out before the customer 22 who wants to charge electronic money inputs a charging amount displayed on the charging screen SC1 on the touch panel 11*g*2 for customer of the commodity registration apparatus 11 is identical to that carried out in the first embodiment.

There is a virtual case in which the customer 22 who purchases a commodity A sold at a unit price of 600 Yen and two commodities B sold at a unit price of 1000 Yen inputs a charging amount '5000 Yen'. Further, the store clerk 21 selects the settlement apparatus 'C' 12 included in four settlement apparatuses 'A', 'B', 'C' and 'D' 12 as a transmission destination. Thus, the customer 22 moves to the designated settlement apparatus 'C' 12 to execute a settlement operation.

In this case, as the record RC2 relating to a charging amount is contained in the settlement information transmitted to settlement apparatus 'C' 12, the settlement screen SC7 shown in FIG. 14 is displayed on the touch panel 12*g* of the settlement apparatus 'C' 12. The grand total amount '7600' consisting of the total amount '2600 Yen' of purchased commodities and the charge amount '5000 Yen' is displayed as a transaction amount.

Thus, the customer 22 holds his or her electronic money card over the card reader/writer 12*i*. In this case, if it is assumed that the balance of electronic money is 600 Yen, then the balance is insufficient for the transaction amount, thus, a guidance is displayed on the settlement screen SC7 to instruct the customer 22 to deposit cash equal to the shortage amount ('7000 Yen'), as shown in FIG. 15.

Then, the customer deposits cash equal to or more than the shortage amount, for example, 10000 Yen, to the automatic change machine 12*e*. Consequentially, 3000 Yen is dispensed from the automatic change machine 12*e* as change in the settlement apparatus 'C' 12. Further, the balance of electronic money is rewritten to 5000 Yen by deducting the total amount '2600 Yen' of purchased commodities from the balance '7600 Yen' of the electric money in which the shortage amount 7000 Yen is charged.

In this way, the customer 22 pays a part of the purchase amount '2600 Yen' with the balance of electronic money '600 Yen' and the rest of the purchase amount with cash (the amount of cash temporarily charged as electronic money) and thus, the result is the same as that the customer charges 5000 Yen in the electronic money card.

On the other hand, if it is assumed that the balance of electronic money is 8600 Yen, then the balance is sufficient for the transaction, thus, a guidance is displayed on the settlement screen SC7 to instruct the customer to deposit the charging amount '5000 Yen' in cash, as shown in FIG. 16.

Then, the customer deposits cash equal to or more than the charging amount, for example, 10000 Yen, to the automatic change machine 12*e*. Consequentially, 5000 Yen is dispensed from the automatic change machine 12*e* as change in the settlement apparatus 'C' 12. Further, the balance of electronic money is rewritten to 11000 Yen by deducting the total amount '2600 Yen' of purchased commodities from the balance '13600 Yen of the electric money in which the charging amount 5000 Yen is charged.

In this way, the result of the above is the same as that the customer 22 settles the purchase amount '2600 Yen' with the balance '8600 Yen' of electronic money and thus charges 5000 Yen in the electronic money card.

As described above, the effect achieved in the first embodiment is also achieved by the checkout system 10 of the second embodiment.

The present invention is not limited to the foregoing embodiments.

For example, in the foregoing embodiments, the charging screen SC1 is displayed on the touch panel 11*g*2 for customer; however, the charging screen SC1 may also be displayed on the touch panel 11*g*1 for store clerk. In this case, the store clerk may input a charging amount told by the customer 22 to the charging screen SC1.

In the foregoing embodiments, an electronic money card is charged with cash; however, the charged money is not limited to cash. A gift certificate, a credit card or the like other than cash may also be used to charge a charging amount to the electronic money card.

Further, in the foregoing embodiments, a semi-self-service checkout system is exemplified; however, the present invention is not necessarily limited to the semi-self-service checkout system. For example, the electronic money charging function applied in the foregoing embodiments is also applicable to a checkout system in which a settlement unit is operated by a store clerk. Further, the electronic money charging function is also applicable to a checkout system in which an input unit and a settlement unit are integrated with each other but not separated from each other, for example, so-called face-to-face type POS terminal or self-checkout POS terminal.

Further, in the foregoing embodiments, the checkout system for settling a transaction relating to a commodity sales is exemplified but can also be applied to settling a transaction relating to the rendering of service, for example, the usage charge for a parking lot or an athletic facility, or the entrance fee for an amusement park.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A checkout system comprising an input unit and a settlement unit, wherein:
   the input unit comprises:
      a first memory storing executable instructions;
      a first processor configured to execute the executable instructions stored in the first memory to perform operations including:
         receive an input of data on commodity sales or service rendering, and store transaction data for a settlement target in the first memory based on the input data;
         receive an input of a charging amount for electronic money, and add amount data of the input charging amount to the first memory; and
         output the data stored in the first memory to the settlement unit; and
   the settlement unit comprises:
      a reader/writer configured to read and rewrite an electronic money balance stored in a storage medium;
      a second memory storing executable instructions; and
      a second processor configured to execute the executable instructions stored in the second memory to perform operations including:
         determine whether or not the data output by the input unit includes the amount data of the charging amount;
         determine, if the data output by the input unit includes the amount data of the charging amount, whether or not the electronic money balance read by the reader/writer is equal to or greater than a transaction amount calculated based on the data output by the input unit;
         wait, if the electronic money balance is equal to or greater than the transaction amount, for an amount of money equal to or greater than the charging amount to be received by a non-electronic money settlement method; and
         add, if the amount of money equal to or greater than the charging amount is received by the non-electronic money settlement method, the charging amount to the electronic money balance via the reader/writer.

2. The checkout system according to claim 1, wherein the settlement unit further comprises the second processor configured to process settlement of a transaction that yields the transaction amount, using the electronic money balance after addition of the charging amount.

3. The checkout system according to claim 2, wherein, if the electronic money balance is smaller than the transaction amount, the second processor is configured to add a shortage amount as a difference between the transaction amount and the electronic money balance to the electronic money balance via the reader/writer on condition that an amount of money equal to or greater than the shortage amount is received.

4. The checkout system according to claim 3, wherein the settlement unit further comprises a first display unit configured to display the charging amount on a display device if the electronic money balance is equal to or greater than the transaction amount.

5. The checkout system according to claim 3, wherein the settlement unit further comprises a second display unit configured to display the shortage amount on a display device if the electronic money balance is smaller than the transaction amount.

6. The checkout system according to claim 1, wherein the non-electronic money settlement method comprises cash, a credit card, or a coupon.

7. A checkout system comprising an input unit and a settlement unit, wherein:
the input unit comprises:
  a first memory storing executable instructions; and
  a first processor configured to execute the executable instructions stored in the first memory to perform operations including:
    receive an input of data on commodity sales or service rendering, and store transaction data for a settlement target in a the first memory based on the input data;
    receive an input of a charging amount for electronic money, and add amount data of the input charging amount to the first memory; and
    output the data stored in the first memory to the settlement unit; and
the settlement unit comprises:
  a reader/writer configured to read and rewrite an electronic money balance stored in a storage medium;
  a second memory storing executable instructions; and
  a second processor configured to execute the executable instructions stored in the second memory to perform operations including:
    determine whether or not the data output by the input unit includes the amount data of the charging amount;
    determine, if the data output by the input unit includes the amount data of the charging amount, whether or not the electronic money balance read by the reader/writer is smaller than a transaction amount calculated based on the data output by the input unit;
    wait, if the electronic money balance is smaller than the transaction amount, for an amount of money equal to or greater than the charging amount to be received by a non-electronic money settlement method; and
    add, if the amount of money smaller than the charging amount is received by the non-electronic money settlement method, a shortage amount as a difference between the transaction amount and the electronic money balance to the electronic money balance via the reader/writer.

8. The checkout system according to claim 7, wherein the settlement unit further comprises a the second processor configured to process settlement of a transaction that yields the transaction amount, using the electronic money balance after addition of the shortage amount.

* * * * *